(12) United States Patent
Nobayashi et al.

(10) Patent No.: US 7,819,538 B2
(45) Date of Patent: Oct. 26, 2010

(54) ROTATING LAMP

(75) Inventors: Isao Nobayashi, Osaka (JP); Takashi Uchida, Osaka (JP)

(73) Assignee: Arrow Co., Ltd., Osaka (JP)

( * ) Notice: Subject to any disclaimer, the term of this patent is extended or adjusted under 35 U.S.C. 154(b) by 286 days.

(21) Appl. No.: 11/911,313

(22) PCT Filed: Feb. 21, 2006

(86) PCT No.: PCT/JP2006/303002
§ 371 (c)(1),
(2), (4) Date: Oct. 11, 2007

(87) PCT Pub. No.: WO2006/112131
PCT Pub. Date: Oct. 26, 2006

(65) Prior Publication Data
US 2009/0067152 A1    Mar. 12, 2009

(30) Foreign Application Priority Data
Apr. 15, 2005 (JP) ............... 2005-118703
Nov. 15, 2005 (JP) ............... 2005-330278

(51) Int. Cl.
*F21V 21/30* (2006.01)
(52) U.S. Cl. .............. 362/35; 362/277; 362/296.01; 362/545
(58) Field of Classification Search ............ 362/35, 362/269, 271, 277, 284, 285, 296.01, 545
See application file for complete search history.

(56) References Cited
U.S. PATENT DOCUMENTS

| | | | | |
|---|---|---|---|---|
| 3,266,014 A | * | 8/1966 | Leotta | 340/815.77 |
| 3,764,799 A | * | 10/1973 | Schulz | 362/35 |
| 4,054,791 A | | 10/1977 | Du Shane | |
| 4,229,781 A | * | 10/1980 | Hitora | 362/274 |
| 5,517,388 A | * | 5/1996 | Hutchisson | 362/35 |

(Continued)

FOREIGN PATENT DOCUMENTS

AU    49800/85    12/1985

(Continued)

OTHER PUBLICATIONS

International search Report, PCT/JP2006/303002, mailed May 16, 2006.

(Continued)

*Primary Examiner*—Sandra L O'Shea
*Assistant Examiner*—Meghan K Dunwiddie
(74) *Attorney, Agent, or Firm*—Ditthavong Mori & Steiner, P.C.

(57) ABSTRACT

The inventive rotating lamp comprises a substrate, a translucent globe mounted on the substrate, a shaft portion set in the substrate, a rotatable member rotatably supported by the shaft portion, a main reflecting mirror, arranged on the upper surface of the rotatable member, having a light reflecting surface constituted of a paraboloid, a light-emitting diode and a drive portion rotating/driving the rotatable member, and the optical axis of the light-emitting diode and the reflecting surface of the main reflecting mirror intersect with each other. Thus, a rotating lamp employing a light-emitting diode capable of delivering light emitted from the rotating lamp to a distance place by improving reflection efficiency can be obtained.

19 Claims, 24 Drawing Sheets

U.S. PATENT DOCUMENTS

| | | |
|---|---|---|
| 6,183,100 B1 | 2/2001 | Suckow et al. |
| 2004/0042212 A1 | 3/2004 | Du et al. |
| 2005/0063185 A1 | 3/2005 | Monjo et al. |

FOREIGN PATENT DOCUMENTS

| | | |
|---|---|---|
| DE | 1789159 U | 5/1959 |
| DE | 20311169 U1 | 10/2003 |
| EP | 0481244 | 4/1992 |
| EP | 1077344 | 2/2001 |
| JP | 43-22006 | 9/1968 |
| JP | 2-29108/1990 | 2/1990 |
| JP | 3-80910 | 8/1991 |
| JP | 3-80910/1990 | 8/1991 |
| JP | 4-98209/1992 | 8/1992 |
| JP | 11-111014 | 4/1994 |
| JP | 6-314509 | 11/1994 |
| JP | 7-230709 | 8/1995 |
| JP | 11-111014 | 4/1999 |
| JP | 2001-332768 | 11/2001 |
| JP | 2002-162626 | 6/2002 |
| JP | 2002-163903 | 6/2002 |
| JP | 2002-237204 | 8/2002 |
| JP | 2004-55168 | 2/2004 |
| JP | 2004-354493 | 12/2004 |

OTHER PUBLICATIONS

Extended European Search Report, 05027913.2, mailed Apr. 19, 2006.

* cited by examiner

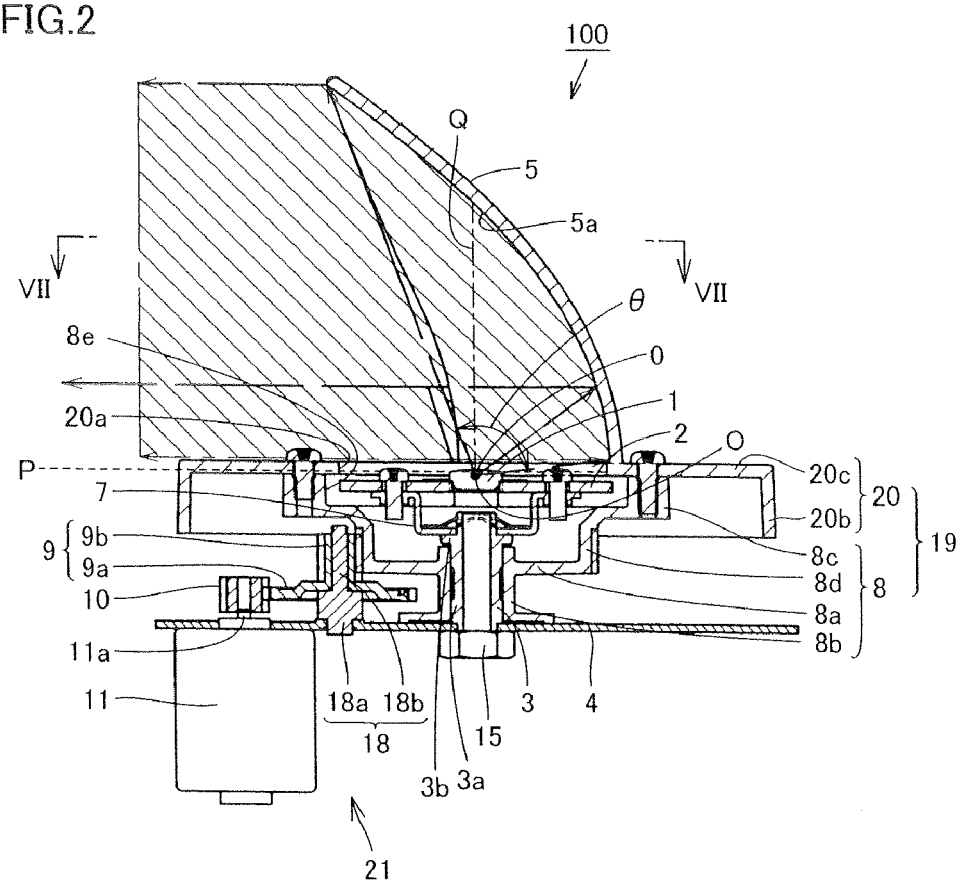

ROTATING LAMP

TECHNICAL FIELD

The present invention relates to a rotating lamp employing a light-emitting diode.

BACKGROUND ART

A rotating lamp employing an incandescent lamp for a light source is known in general. However, the rotating lamp employing an incandescent lamp is disadvantageously burned out in a short period, consumes high power and requires much labor for maintenance/management.

Therefore, an LED device has recently been employed as the light source for a rotating lamp. For example, Japanese Patent Laying-Open No. 2002-163903 (Patent Document 1) describes an exemplary rotating lamp employing LED devices as a light source.

In the rotating lamp described in Japanese Patent Laying-Open No. 2002-163903, a plurality of LED devices are radially arranged on the upper and lower surfaces of a discoidal holder for forming a light source, and a cylindrical rotating reflector is provided around this light source. In the rotating lamp having this structure, the reflector rotates around the light source constituted of the LED devices, to horizontally reflect light emitted from the LED devices.

The light reflected by the reflector is substantially parallel, and hence it is necessary to ensure a sectional area of the reflecting light path in order to deliver the reflected light over a wide range. Therefore, the reflector has an opening of a prescribed size in general. Thus, a large number of LED devices are located on a side of the reflector closer to the opening. Consequently, the light emitted from the LED devices is directly radiated outward at a high rate.

Patent Document 1: Japanese Patent Laying-Open No. 2002-163903

DISCLOSURE OF THE INVENTION

Problems to be Solved by the Invention

As described above, the reflector of the aforementioned conventional rotating lamp has low reflection efficiency for the light emitted from the LED devices. The light emitted from the LED devices tends to spread at a distant place despite high directivity thereof. Thus, the rotating lamp cannot deliver the light to a distant place if the reflector has low reflection efficiency.

The present invention has been proposed in consideration of the aforementioned problem, and an object thereof is to provide a rotating lamp employing a light-emitting diode capable of delivering light emitted therefrom to a distant place by improving reflection efficiency.

Means for Solving the Problems

The rotating lamp according to the present invention comprises a substrate, a translucent globe mounted on the substrate, a shaft portion set in the substrate, a rotatable member rotatably supported by the shaft portion, a reflecting mirror arranged on the upper surface of the rotatable member and at least partially constituted of a parabolic reflecting surface, a light-emitting diode functioning as a light source and a drive portion rotating/driving the rotatable member, and arranges the light-emitting diode and the reflecting mirror so that the optical axis of the light-emitting diode and the reflecting surface of the reflecting mirror intersect with each other. Preferably, the aforementioned light-emitting diode is arranged on a focal position upon irradiation of parallel light toward the reflecting surface, and the reflecting mirror has a shape extending sideward from behind the light-emitting diode to project frontward beyond the light-emitting diode via a portion above the light-emitting diode. Preferably, the rotating lamp further comprises an auxiliary reflecting mirror arranged on the upper surface of the rotatable member and opposed to the reflecting mirror, and the light-emitting diode is arranged between the auxiliary reflecting mirror and the reflecting mirror. Preferably, the aforementioned auxiliary reflecting mirror has an arcuately curved surface opposed to the reflecting mirror, and the curved surface is inclined to be increased in height and gradually increased in circumferential length as separated from the light-emitting diode. Preferably, a light emitter having the light-emitting diode includes an annular member and at least one platelike member arranged along the circumferential direction of the annular member so that a first end is arranged in the annular member, and the platelike member includes an extensional portion extending outward from the annular member. Preferably, the rotating lamp further comprises a printed board provided with the light emitter and a coupling member coupling the printed board and the shaft portion with each other, and the shaft portion, the printed board and the coupling member are made of a material containing metal. Preferably, the rotating lamp further comprises a flat support plate supporting the rotatable member and the shaft portion, and the support plate is made of a material containing metal. Preferably, the aforementioned light-emitting diode is fixed to the upper wall of the globe. Preferably, the rotating lamp further comprises a heat radiating portion capable of dispersing heat generated in the aforementioned light-emitting diode outward, and the light-emitting diode is fixed to the upper wall of the globe through the heat radiating portion. Preferably, the aforementioned heat radiating portion includes a printed board mounted with the light-emitting diode on the surface thereof and a radiator plate mounted with the printed board on the surface thereof, and the radiator plate is fixed to the upper wall of the globe. Preferably, the rotating lamp further comprises a lead wire for supplying power to the aforementioned light-emitting diode, and the lead wire is arranged along the inner surface of the globe.

Preferably, the aforementioned reflecting mirror includes the parabolic first reflecting surface and second and third reflecting surfaces arranged on both sides of the first reflecting surface, the second reflecting surface reflects light from the light-emitting diode toward the substrate beyond reflected light reflected by the first reflecting surface, and the third reflecting surface reflects the light toward the upper end of the reflecting mirror beyond the reflected light. Preferably, a plurality of second reflecting surfaces and a plurality of third reflecting surfaces are formed from the substrate toward the upper end of the reflecting mirror, the area of the second reflecting surface located on the substrate is smaller than the area of the second reflecting surface located on the upper end of the reflecting mirror, and the area of the third reflecting surface located on the upper end of the reflecting mirror is smaller than the area of the third reflecting surface located on the substrate. Preferably, the rotating lamp further comprises a light guide guiding light from the light-emitting diode. Preferably, the light guide has a reflecting surface reflecting the light. Preferably, the rotating lamp further comprises a condensing portion condensing the light from the aforementioned light-emitting diode and supplying the light to the light guide. Preferably, the aforementioned light guide is uprightly provided on the light-emitting diode, and has a scattering portion scattering the light on the forward end thereof.

EFFECTS OF THE INVENTION

The rotating lamp according to the present invention can deliver light to a distant place.

BRIEF DESCRIPTION OF THE DRAWINGS

FIG. 2 is a side sectional view of the rotating lamp taken along the line II-II in FIG. 1.

FIG. 3 is a perspective view showing a printed board, a light emitter and a main gear.

DESCRIPTION OF THE REFERENCE SIGNS 1 light emitter, 2 printed board, 3 shaft portion, 4 chassis (support plate), 5 reflecting mirror, 5a reflecting surface, 7 flange (coupling member), 8 main gear, 9 intermediate gear, 10 pinion, 11 motor, 20 base, 20a opening, 21 drive portion, 31 lead frame, 33 housing (annular member), 34 light-emitting diode, 35 extensional portion, 50 auxiliary reflecting mirror, 50c subreflecting surface, 60 power LED.

BEST MODES FOR CARRYING OUT THE INVENTION

Embodiments of the present invention are now described with reference to FIGS. 1 to 32.

First Embodiment

Figure 1:
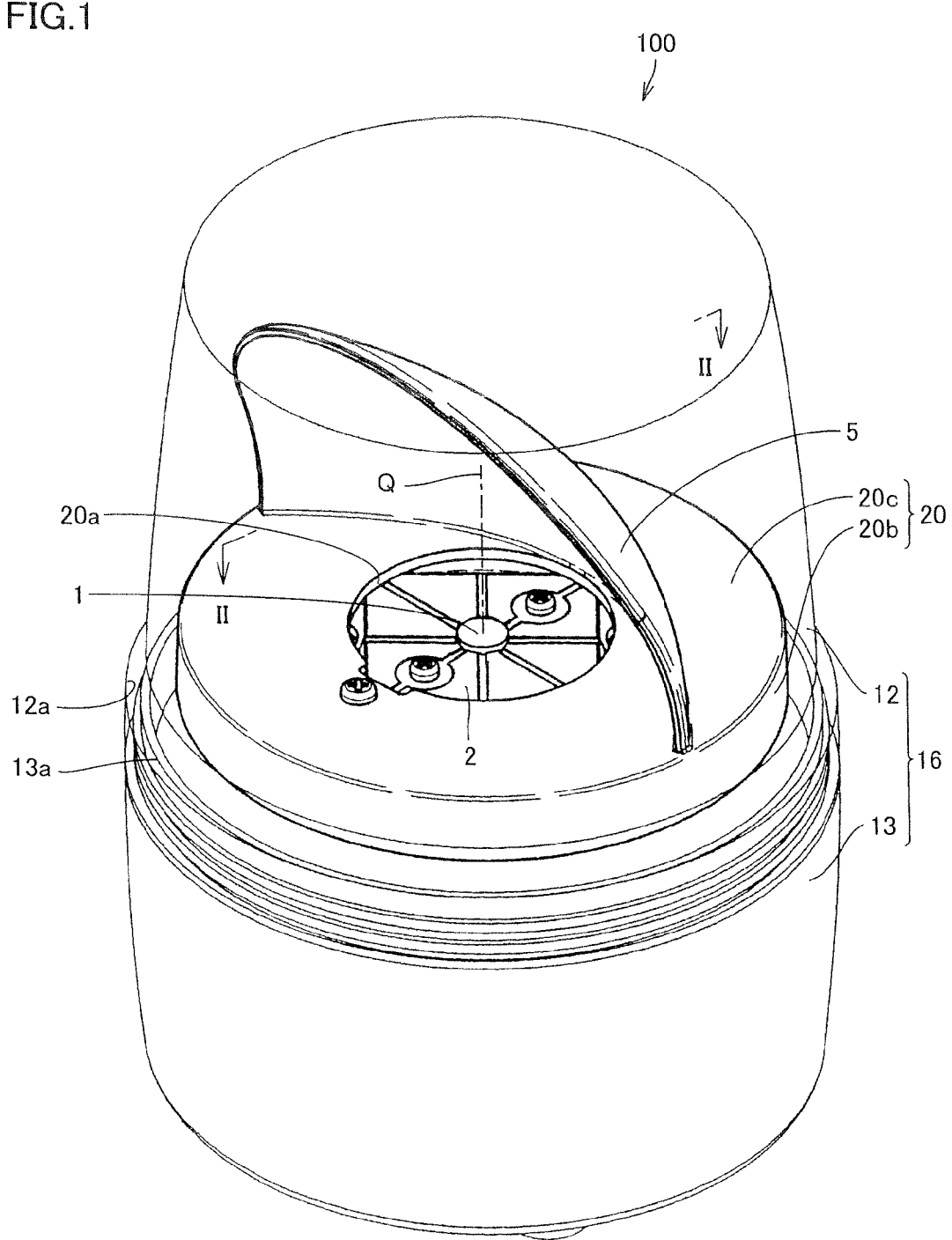
FIG. 1 is a perspective view of a rotating lamp according to a first embodiment of the present invention.

FIG. 1 is a perspective view of a rotating lamp 100 according to a first embodiment of the present invention. As shown in FIG. 1, the rotating lamp 100 comprises a housing 16 including a transparent globe 12 and a body (substrate) 13. The globe 12 is substantially in the form of a hollow cylinder. This globe 12 is provided on its lower surface with an outward opening 12a having screws formed on the inner peripheral surface thereof. The body 13 is also substantially in the form of a hollow cylinder. This body 13 is provided on its upper surface with an outward opening 13a having screws formed on the outer peripheral surface thereof for fitting with the screws formed on the opening 12a. The screws formed on the openings 13a and 12a fit with each other for integrating the globe 12 and the body 13 with each other, thereby constituting the housing 16.

A circular base 20 is arranged in the vicinity of the openings 12a and 13a. FIG. 2 is a side sectional view of the rotating lamp 100 taken along the line II-II in FIG. 1. As shown in FIG. 2, the rotating lamp 100 further comprises a shaft portion 3 arranged in the body 13, a rotatable member 19 rotatably supported by the shaft portion 3, a reflecting mirror 5, arranged on the upper surface of the rotatable member 19, having a parabolic light reflecting surface 5a, a light emitter 1 and a drive portion 21 rotating/driving the rotatable member 19. The rotating lamp 100 also comprises a flat chassis (support plate) 4 supporting the rotatable member 19 and the shaft portion 3.

The chassis 4, sized to cover the opening 13a of the body 13, is in the form of a circular flat plate. This chassis 4 is made of a material containing metal. The chassis 4 is preferably made of copper or aluminum. The cylindrical shaft portion 3 is arranged on the upper surface of the center of the chassis 4. A nut 15 is engaged with the lower end of the shaft portion 3 from under the chassis 4. The drive portion 21 driving the rotatable member 19 is provided on the chassis 4.

The shaft portion 3 includes a cylindrical portion 3a and a bulge portion 3b outwardly bulging from the upper end of the cylindrical portion 3a. Wires (not shown) are arranged in the cylindrical portion 3a. The shaft portion 3 is made of a material containing metal. The shaft portion 3 is preferably made of copper or aluminum. The rotatable member 19 is arranged on the outer peripheral surface of the cylindrical portion 3a of the shaft portion 3.

The rotatable member 19 includes the base 20 and a main gear 8 arranged on the lower surface of the base 20. The base 20 includes an upper surface 20c in the form of a circular flat plate and a peripheral wall portion 20b suspended from the outer peripheral edge of the upper surface 20c. A circular opening 20a is formed on the center of the upper surface 20c. The main gear 8 includes a cylindrical portion 8b, a circular discoidal portion 8a formed on the upper end of the cylindrical portion 8b, a peripheral wall portion 8d upwardly formed on the outer peripheral edge of the discoidal portion 8a and mounting portions 8c formed on the upper end of the peripheral wall portion 8d. The mounting portions 8c, outwardly enlarged in diameter from the upper end of the peripheral wall portion 8d, are formed with threaded holes on the upper ends thereof. Therefore, the main gear 8 is so hollowed as to form a storage portion 8e therein. The main gear 8 and the base 20 are integrally connected with each other through screws fitted with the mounting portions 8c. A plurality of teeth are circumferentially formed on the outer peripheral edge of the discoidal portion 8a and the outer peripheral surface of the peripheral wall portion 8d.

The light emitter 1, a flat printed board 2 provided with the light emitter 1 and a flange (coupling member) 7 coupling the printed board 2 and the shaft portion 3 with each other are provided in the main gear 8.

The upper end of the flange 7 is fixed to the printed board 2 with screws, while the lower end thereof is embedded in the bulge portion 3b of the shaft portion 3. Therefore, the shaft portion 3, the flange 7, the printed board 2 and the light emitter 1 are integrally coupled with each other. The light emitter 1 is arranged on the center of the printed board 2 along the central axis of the shaft portion 3. The flange 7, made of a material containing metal, is preferably made of copper or aluminum.

The drive portion 21 includes a support shaft 18, an intermediate gear 9 supported by the support shaft 18, a pinion 10 meshing with the intermediate gear 9 and a motor 11 rotating/driving the pinion 10. The support shaft 18 is arranged on a portion of the upper surface of the chassis 4 closer to the outer peripheral edge thereof than the rotatable member 19. The motor 11 is arranged on a side closer to the outer peripheral edge of the chassis 4 than the support shaft 18. The support shaft 18 has a large-diametral part 18a provided on the upper surface of the chassis 4 and a small-diametral part 18b, provided on the upper end of the large-diametral part 18a, having a smaller diameter than the large-diametral part 18a. Therefore, the support shaft 18 is stepped halfway. The support shaft 18 is engagingly inserted into the intermediate gear 9 for rotatably supporting the same. The intermediate gear 9 includes a discoidal portion 9a and a cylindrical portion 9b formed on the upper surface of the discoidal portion 9a. Teeth meshing with those formed on the main gear 8 are formed on the outer peripheral surface of the cylindrical portion 9b, while a plurality of teeth are formed also on the outer peripheral edge of the discoidal portion 9a.

The motor 11 is arranged on the lower surface of the chassis 4 so that a drive shaft 11a of this motor 11 passes through the chassis 4 from the lower surface toward the upper surface thereof. The pinion 10 is provided on the upper end of the drive shaft 11a. A plurality of teeth are formed on the outer peripheral surface of the pinion 10 for meshing with the teeth formed on the discoidal portion 9a of the intermediate gear 9.

FIG. 3 is a perspective view of the printed board 2, the light emitter 1 and the main gear 8. As shown in FIG. 3, the mounting portions 8c of the main gear 8 are formed on four positions of the upper end surface of the peripheral wall portion 8d along the circumferential direction. The printed board 2 is arranged inside the four mounting portions 8c. The printed board 2, made of a material containing metal, is preferably made of aluminum or copper.

Figure 4:
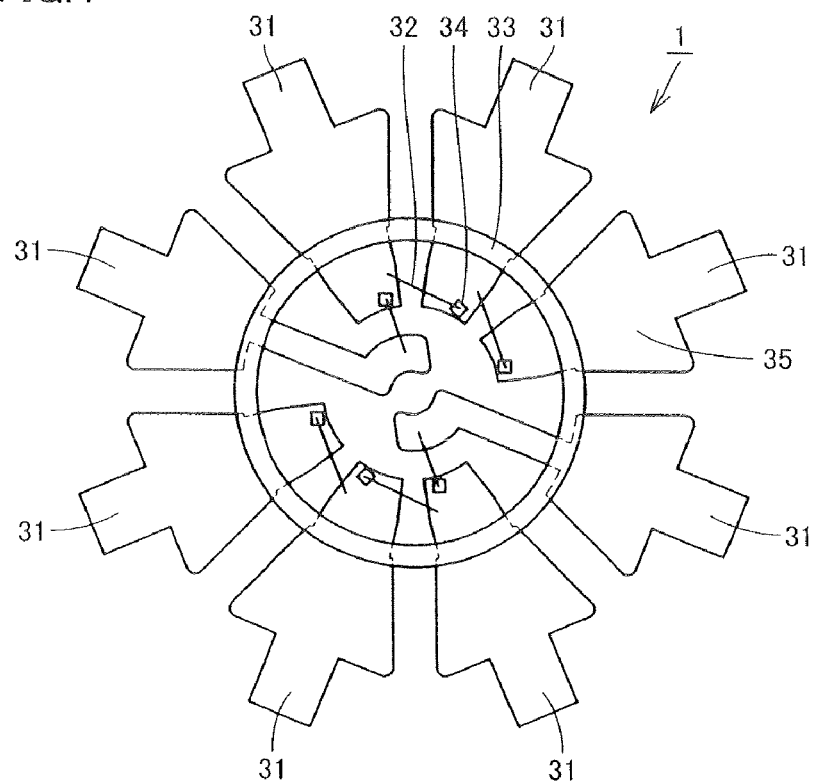
FIG. 4 is a top plan view of the light emitter of the rotating lamp according to the first embodiment.

FIG. 4 is a top plan view of the light emitter 1. As shown in FIG. 4, the light emitter 1 includes an annular housing (annular member) 33, at least one or more lead frames (platelike members) 31 arranged along the circumferential direction of the housing 33 so that first ends thereof are arranged in the housing 33 and light-emitting diodes 34 provided on second ends of the lead frames 31.

The lead frames 31 are provided on eight portions along the circumferential direction of the housing 33, and the light-emitting diodes 34 are arranged on the forward ends of six of the lead frames 31 excluding an opposite pair of opposite lead frames 31. Two triplets of adjacent light-emitting diodes 34, serially connected with each other by wires 32, are arranged in parallel with each other. The lead frames 31 are in the form of long flat plates having first ends arranged in the housing 33. The lead frames 31 are provided with extensional portions 35 extending outward from the housing 33.

Figure 5:
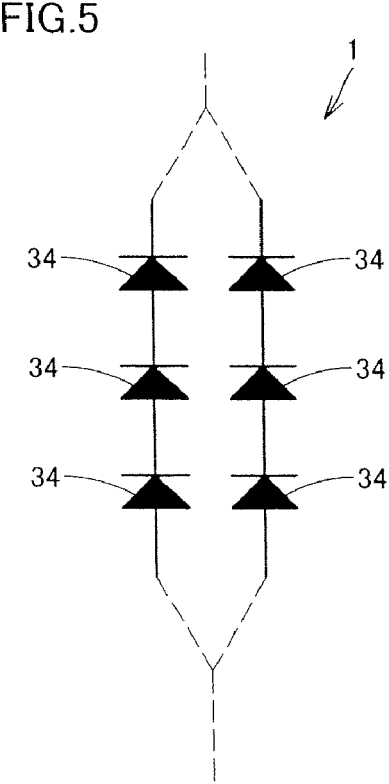
FIG. 5 is a wiring diagram showing the state of connection of light-emitting diodes.

FIG. 5 is a wiring diagram showing the state of connection of the light-emitting diodes 34. As shown in FIG. 5, the two triplets of light-emitting diodes 34 serially connected with each other are connected in parallel with each other.

Figure 6:
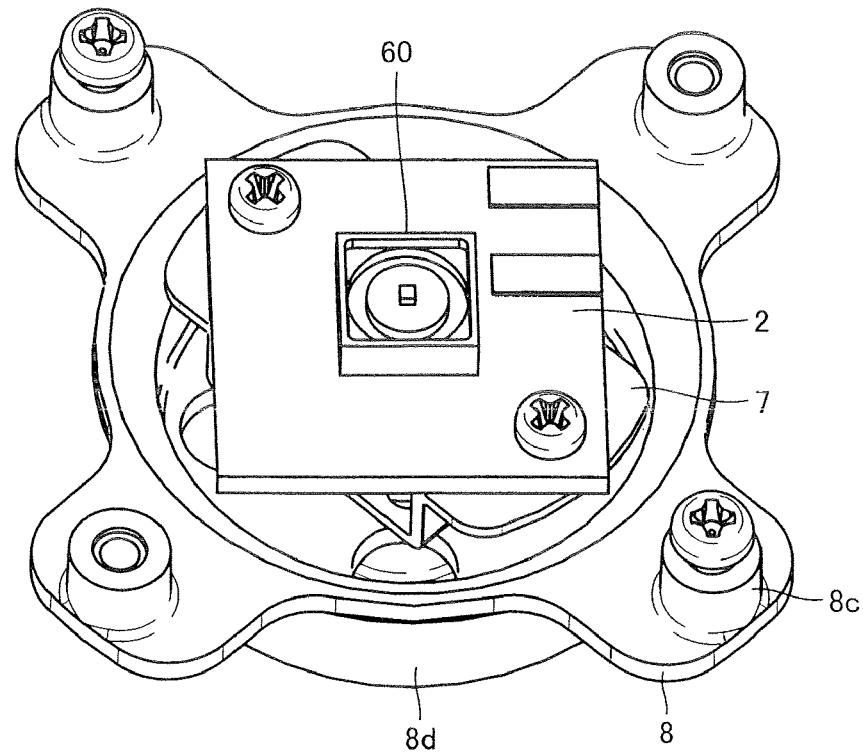
FIG. 6 is a perspective view showing a modification of the light emitter.

While the rotating lamp 100 according to the first embodiment is provided with the plurality of light-emitting diodes 34, the present invention is not restricted to this. FIG. 6 is a perspective view showing a modification of the light emitter 1. As shown in FIG. 6, a light emitter 1 having a power LED (light-emitting diode) 60 arranged on the center of a printed board 2 may alternatively be employed. The power LED 60 emitting a large quantity of light can be utilized as the light source for the rotating lamp 100.

Referring to FIG. 2, the reflecting mirror 5 provided on the upper surface 20c of the base 20 is arranged in the vicinity of the opening 20a. This parabolic reflecting mirror 5 is arranged to cover the light emitter 1 arranged on the center of the opening 20a. Therefore, the reflecting mirror 5 extends sideward from behind the light-emitting diodes 34 shown in FIG. 4 to project frontward beyond the light-emitting diodes 34 via portions above the light-emitting diodes 34. The axis P of the parabolic reflecting surface 5a is parallelized with the upper surface 20c of the base 20. The body 13 is so horizontally arranged as to horizontally direct the axis P.

The optical axis Q of each light-emitting diode 34 is arranged on or around the rotational axis of the reflecting mirror 5, to intersect with the reflecting mirror 5. In other words, the optical axis Q is arranged on or around the central axis of the shaft portion 3, and parallelized therewith.

The light-emitting diodes 34 emit conical light substantially symmetrically about the central axis of the shaft portion 3.

On the other hand, the reflecting mirror 5 intersecting with the optical axes Q of the light-emitting diodes 34 rotates about the shaft portion 3. Therefore, the light emitted from the light-emitting diodes 34 toward the reflecting mirror 5 hardly fluctuates upon rotation of the reflecting mirror 5 about the shaft portion 3. In other words, the light emitted from the light-emitting diodes 34 hits the reflecting mirror 5 at a substantially unfluctuant angle and the reflecting mirror 5 reflects the light in a substantially unfluctuant mode regardless of rotation of the reflecting mirror 5 about the shaft portion 3, so that the rotating lamp 1000 radiates stationary reflected light regardless of the rotation of the reflecting mirror 5.

According to the first embodiment, the angle of light emission from the light-emitting diodes 34 is about 170°. Further, the angle formed by a line segment connecting each light-emitting diode 34 and the lower end of the reflecting mirror 5 with each other and the upper surface 20c of the base 20 is set to about 10°. In addition, the crossing angle θ formed by a line segment connecting the upper end of the reflecting mirror 5 and a focal point O with each other and another line segment connecting the focal point O and the lower end of the reflecting mirror 5 is set to at least 90° and not more than 120°. Therefore, the light emitter 1 irradiates light toward the overall surface of the reflecting mirror 5 from the lower end up to the upper end. The focal point O is a point where the substantially parabolic reflecting mirror 5 converges reflected light when receiving parallel light parallel to the axis thereof.

If the crossing angle θ is set smaller than 90°, reflection efficiency of the reflecting mirror 5 reflecting the light emitted from the light-emitting diodes 34 having the angle of emission of about 170° is reduced. If the crossing angle θ exceeds 120°, on the other hand, the forward end of the reflecting mirror 5 must disadvantageously be elongated to increase the size of the reflecting mirror 5.

When receiving parallel light parallel to the axis P of the parabolic surface thereof, the reflecting mirror 5 converges the reflected light on one point. Each light-emitting diode 34 is arranged on this convergence point of the reflected light. In other words, each light-emitting diode 34 is arranged on the focal point O of the parallel light applied to the reflecting surface 5a of the reflecting mirror 5. This focal point O is located on or around the central axis of the shaft portion 3.

In the rotating lamp 100 having the aforementioned structure, the motor 11 rotates/drives the pinion 10. When the pinion 10 rotates about the drive shaft 11a, the intermediate gear 9 meshing with the pinion 10 rotates about the support shaft 18. When the intermediate gear 9 rotates about the support shaft 18, the rotatable member 19 fitting with the intermediate gear 9 rotates about the shaft portion 3. Thus, the reflecting mirror 5 provided on the upper surface of the base 20 rotates about the shaft portion 3 upon rotation of the rotatable member 19 about the shaft portion 3. At this time, the focal point O arranged on the central axis of the shaft portion 3 remains unfluctuant on the reflecting surface 5a upon rotation of the reflecting mirror 5.

The optical axes Q of the light-emitting diodes 34 are arranged perpendicularly to the upper surface 20c of the base 20 so that the light-emitting diodes 34 upwardly emit conical light with spreading at the angle of emission of about 170°. On the other hand, the angle θ formed by the line segment connecting the upper end of the reflecting mirror 5 and the focal point O with each other and the line segment connecting the focal point O and the lower end of the reflecting mirror 5 with each other is set to at least 90° and not more than 120°.

If the angle of emission of the light-emitting diodes 34 is smaller than (θ−90°)×2, therefore, the reflecting mirror 5 exhibits reflection efficiency of 100%. Also when the angle of emission of the light-emitting diodes 34 is larger than (θ−90°)×2, the reflecting mirror 5 intersecting with the optical axes Q of the light-emitting diodes 34 and covering upper portions of the light-emitting diodes 34 ensures reflection efficiency of at least 50%.

According to the first embodiment, the light-emitting diodes 34 having the large angle of emission of about 170° exhibit high luminous intensity around the optical axes Q. The optical axes Q of the light-emitting diodes 34 intersect with the reflecting mirror 5, which in turn reliably reflects part of the conical light emitted from the light-emitting diodes 34 having high luminous intensity.

The light emitter 1 irradiates the light toward the overall surface of the reflecting mirror 5, so that the reflecting surface 5a reflects the irradiated light. The parabolic reflecting surface 5a having the horizontally directed axis P horizontally reflects the light received from the light-emitting diodes 34 each arranged on the focal point O. In other words, the light reflected by the reflecting surface 5a horizontally advances in parallel with the axis P of the reflecting surface 5a from the lower end toward the upper end thereof.

Figure 7:
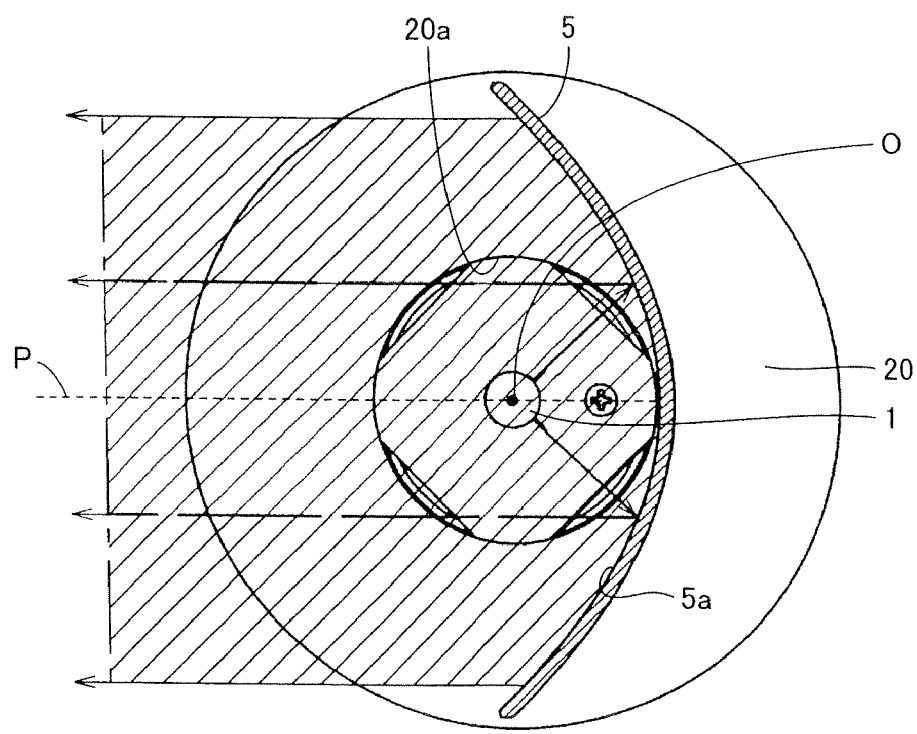
FIG. 7 is a sectional view taken along the line VII-VII in FIG. 2.

FIG. 7 is a sectional view taken along the line VII-VII in FIG. 2. As shown in FIG. 7, the parabolic reflecting surface 5a parallelly reflects the light received from the light emitter 1 including the light-emitting diodes 34 each arranged on the focal point O. At this time, the reflecting surface 5a parallelly reflects the light along the axis P thereof from a first end to a second end thereof. Thus, the reflecting mirror 5 parallelly reflects the light received from the light emitter 1 along the axis P of the reflecting surface 5a. Therefore, the reflected light hardly spreads but reaches a distant place.

The light emitted from the light-emitting diodes 34 toward the reflecting mirror 5 remains unfluctuant regardless of the rotation of the reflecting mirror 5 about the shaft portion 3, and hence the reflecting mirror 5 parallelly reflects the light. Thus, the light reflected by the reflecting mirror 5 outgoes toward a distant place.

When the rotating lamp 100 operates over a long time, the light-emitting diodes 34 generate heat. However, the lead frames 31 include the extensional portions 35 outwardly extending from the housing 33, as shown in FIG. 4. Therefore, the heat generated in the light-emitting diodes 34 is first transferred to the extensional portions of the lead frames 31, and outwardly dissipated through the extensional portions 35. The light emitter 1 including the light-emitting diodes 34, the printed board 2, the flange 7 and the shaft portion 3 are integrated with each other as shown in FIG. 2. Thus, the heat generated in the light-emitting diodes 34 and transferred to the lead frames 31 as shown in FIG. 4 is successively transferred to the printed board 2, the flange 7 and the shaft portion 3 shown in FIG. 2 and dissipated outward. The shaft portion 3, the flange 7 and the printed board 2 made of the material containing metal excellently transfer and dissipate the heat. When made of copper or aluminum, the shaft portion 3, the flange 7 and the printed board 2 exhibit high heat transfer coefficients, to excellently dissipate the heat outward.

The heat transferred to the shaft portion 3 is also excellently transferred to the chassis 4 also made of the material containing metal, to be excellently dissipated outward. When the chassis 4 is made of copper or aluminum, the heat is more excellently transferred to the chassis 4 and dissipated outward.

In addition, the light emitter 1 is arranged in the rotatable member 19 or downward beyond the center of the reflecting surface 5a, whereby a mechanism dissipating the heat transferred from the light-emitting diodes 34 can be stored in the rotatable member 8 and the printed board 2 etc. can be inhibited from blocking the light reflected by the reflecting surface 5a. Further, the light emitter 1 is so arranged closer to the rotatable member 8 that a heat radiating member such as the printed board 2 or the like can be arranged immediately under the light emitter 1 for excellently dissipating the heat transferred from the light-emitting diodes 34 without blocking the reflected light.

In the rotating lamp 100 according to the first embodiment, the reflecting mirror 5 reflects part of the light emitted from the light-emitting diodes 34 at an angle of emission of at least 0° and not more than θ° with high reflection efficiency. Thus, the rotating lamp 100 can convert most of the light received from the light-emitting diodes 34 to parallel light for reliably delivering the light to a distant place.

In particular, the rotating lamp 100 according to the first embodiment, capable of reliably reflecting part of the conical light emitted from the light-emitting diodes 34 having high luminous intensity, can radiate parallel light having high luminous intensity.

Further, the rotating lamp 100, capable of dissipating the heat generated in the light-emitting diodes 34 outward, can elongate the lives of the light-emitting diodes 34.

Second Embodiment

Figure 8:
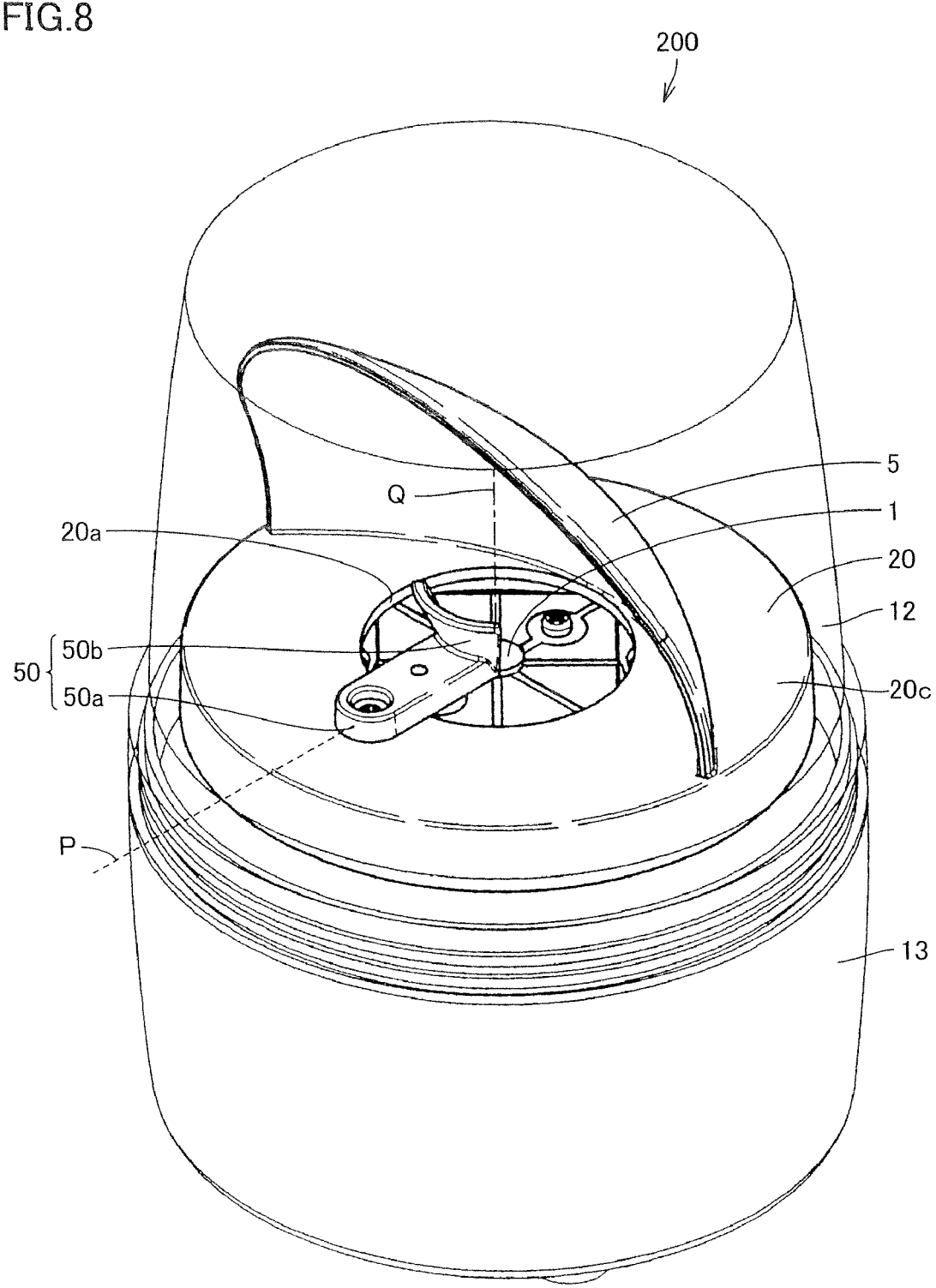
FIG. 8 is a perspective view of a rotating lamp according to a second embodiment of the present invention.

A second embodiment of the present invention is described with reference to FIGS. 8 to 16. FIG. 8 is a perspective view of a rotating lamp 200 according to the second embodiment. As shown in FIG. 8, the rotating lamp 200 includes an auxiliary reflecting mirror 50 opposed to a reflecting mirror 5. This auxiliary reflecting mirror 50 includes a support portion 50a fixed to an upper surface 20c of a base 20 and a subreflecting portion 50b provided on the forward end of the support portion 50a.

The auxiliary reflecting mirror 50 and a light emitter 1 are arranged along an axis P of a reflecting surface 5a, and light-emitting diodes 34 provided in the light emitter 1 are arranged between the reflecting mirror 5 and the auxiliary reflecting mirror 50.

Figure 9:
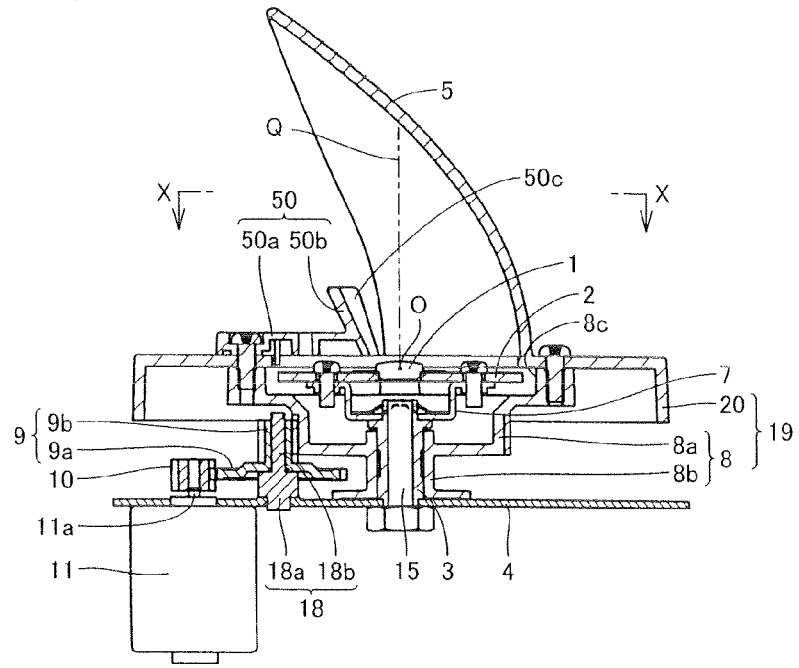
FIG. 9 is a side sectional view of the rotating lamp shown in FIG. 8.

FIG. 9 is a side sectional view of the rotating lamp 200 shown in FIG. 8. As shown in FIG. 9, the auxiliary reflecting mirror 50 has an arcuately curved subreflecting surface 50c opposed to the reflecting mirror 5. The curved subreflecting surface 50c is inclined to be gradually increased in height as separated from the light-emitting diodes 34. The auxiliary reflecting mirror 50 is arranged in a direction along the axis P, to be closer to the outer peripheral edge of the upper surface 20c than a focal point O.

Figure 10:
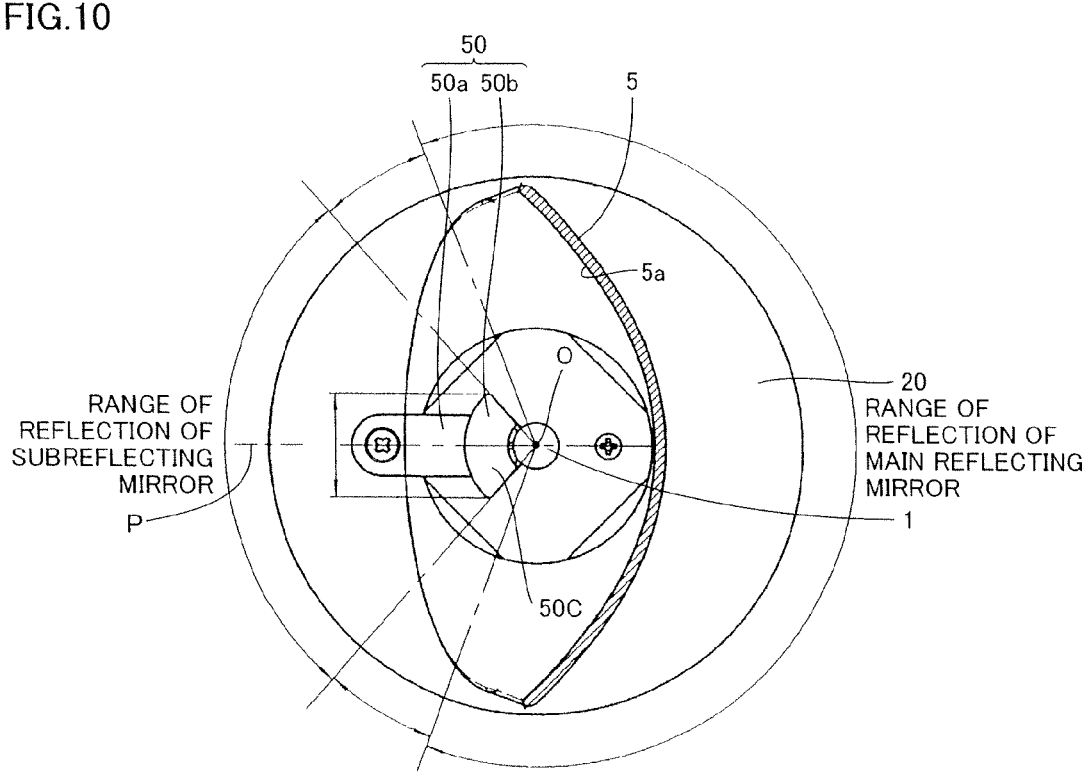
FIG. 10 is a sectional view taken along the line X-X in FIG. 9.

FIG. 10 is a sectional view taken along the line X-X in FIG. 9. As shown in FIG. 10, the circumferential length of the subreflecting surface 50c of the auxiliary reflecting mirror 50 is gradually increased as separated from the focal point O. Therefore, the subreflecting surface 50c is sectorially formed about the focal point O as viewed from above. The light emitter 1 is arranged inside the subreflecting surface 50c, whose lower end is arranged along the outer peripheral edge of the light emitter 1. The subreflecting surface 50c is symmetrically arranged with respect to the axis P of the reflecting surface 5a. While the angle of the subreflecting surface 50c is set to about 90° according to the second embodiment, the present invention is not restricted to this.

Figure 11:
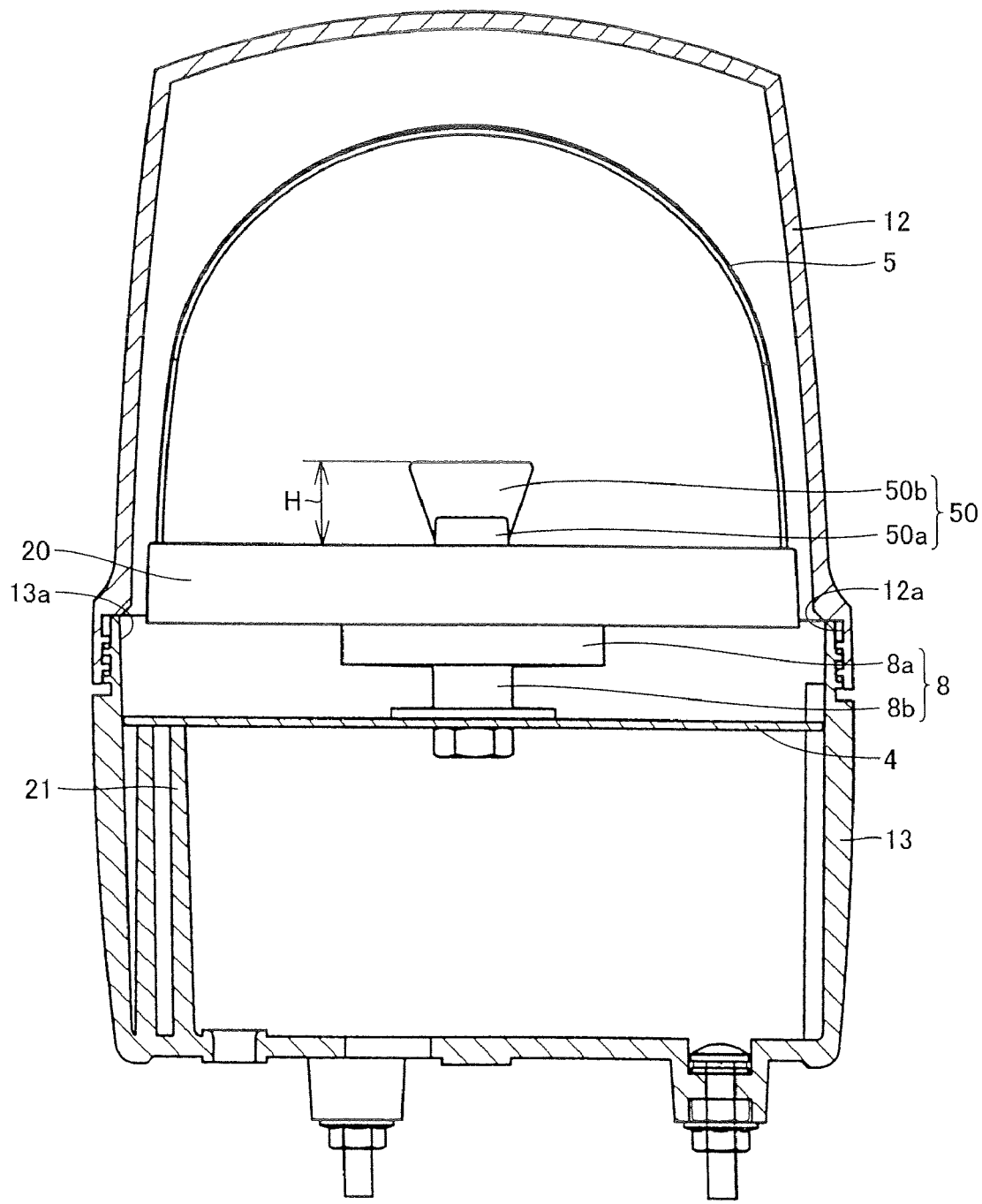
FIG. 11 is a side sectional view of the rotating lamp shown in FIG. 8.

FIG. 11 is a side sectional view of the rotating lamp 200 shown in FIG. 8. As shown in FIG. 11, the subreflecting portion 50b is so formed that the width thereof is gradually increased upward from the upper surface 20c of the base 20. The remaining structure of the rotating lamp 200 according to the second embodiment is similar to that of the rotating lamp 100 according to the aforementioned first embodiment. It is assumed that the height H of the subreflecting portion 50b and the subreflecting surface 50c corresponds to the distance between the upper end of the subreflecting portion 50b and the upper surface 20c of the base 20.

Figure 12:
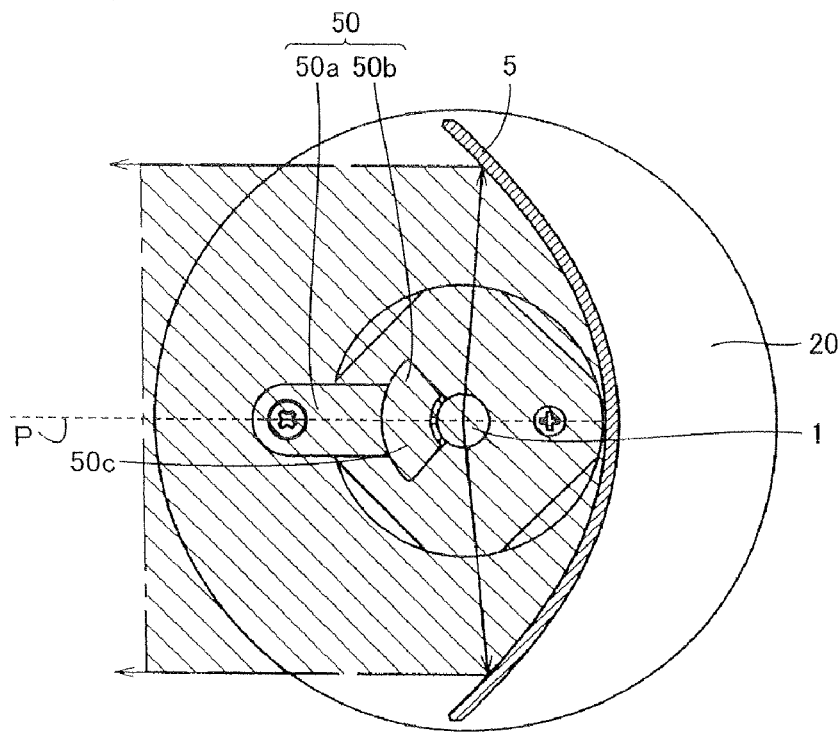
FIG. 12 is a top plan view of the rotating lamp according to the second embodiment.
Figure 13:
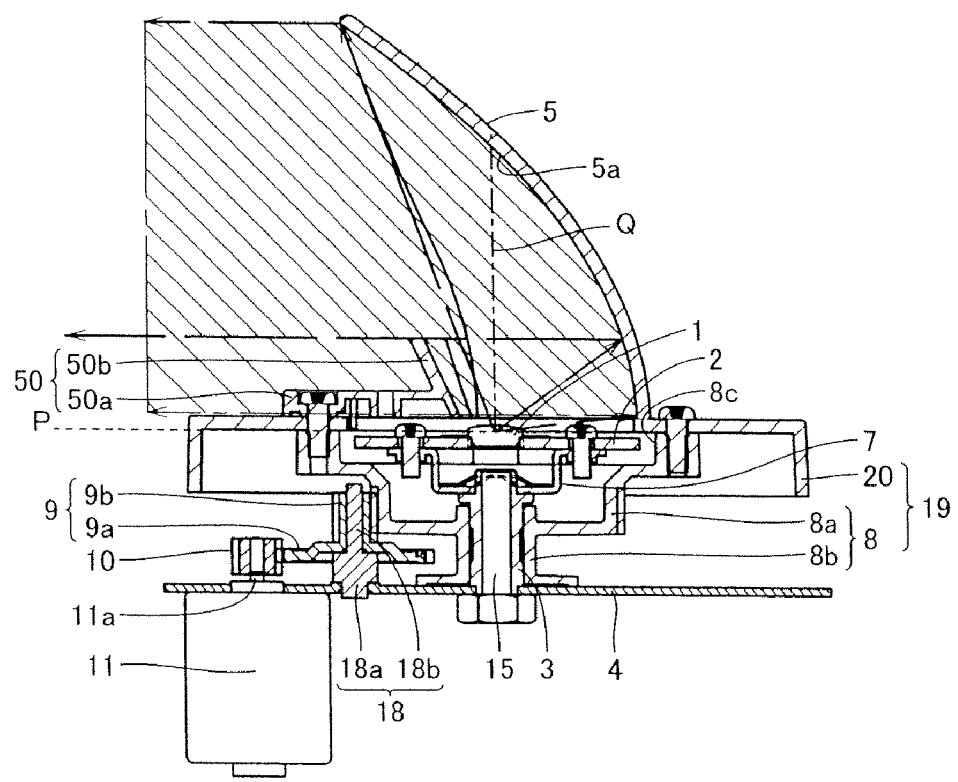
FIG. 13 is a side sectional view of the rotating lamp shown in FIG. 12.

FIG. 12 is a top plan view of the rotating lamp 200 according to the second embodiment. As shown in FIG. 12, the reflecting mirror 5 reflects light received from the light emitter 1 outward as parallel light. FIG. 13 is a side sectional view of the rotating lamp 200. As shown in FIG. 13, the rotating lamp 200 horizontally radiates the light received from the light emitter 1 and reflected by the reflecting mirror 5. In other words, the reflecting mirror 5 reflects the light received from the light emitter 1 as parallel light parallel to the axis P of the reflecting surface 5a also in the rotating lamp 200 according to the second embodiment, similarly to the aforementioned first embodiment.

Figure 14:
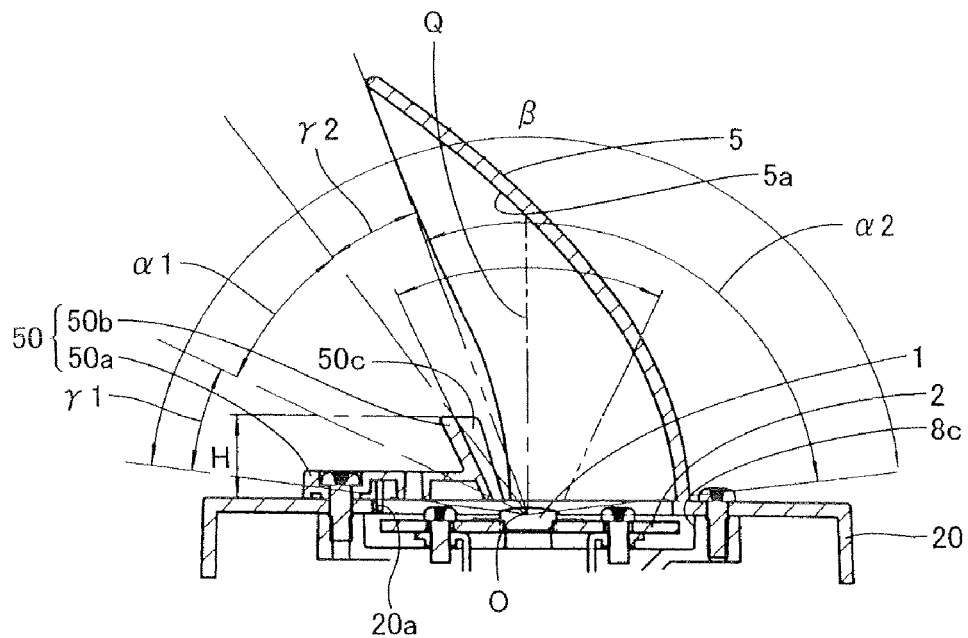
FIG. 14 is a side sectional view of the rotating lamp for illustrating reflection efficiency for light from a light emitter.

FIG. 14 is a side sectional view of the rotating lamp 200 showing reflection efficiency for the light received from the light emitter 1. As shown in FIG. 14, the subreflecting surface 50c reflects a region of the light received from the light emitter 1 held between a line segment passing through the focal point O and the upper end of the subreflecting surface 50c and another line segment passing through the focal point O and the lower end of the subreflecting surface 50c. A retroreflective region reflected by the subreflecting surface 50c, varying with the height H of the subreflecting surface 50c, is widened as the height H of the subreflecting surface 50c is increased. On the other hand, the rotating lamp 200 outwardly radiates part of the light received from the light-emitting diodes 34 passing through the clearance between the lower end of the subreflecting surface 50c and the outer peripheral edge of an opening 20a without reflecting the same by the subreflecting surface 50c. Further, the rotating lamp 200 directly radiates part of the light received from the light-emitting diodes 34 passing through the clearance between the upper ends of the subreflecting surface 50c and the reflecting mirror 5. I is assumed that β represents the total angle of emission of the light-emitting diodes 34, and α1 represents the angle at the focal point O in the angles formed by the focal point O and the upper and lower ends of the subreflecting surface 50c. It is also assumed that α2 represents the angle of the focal point O in a region where the reflecting mirror 5 reflects the light from the light-emitting diodes 34. In addition, γ1 represents the angle of the light outgoing from the light-emitting diodes 34 and passing through the clearance between the lower end of the subreflecting surface 50c and the outer peripheral edge of the opening 20a at the focal point O, and γ2 represents the angle of the light outgoing from the light-emitting diodes 34 and passing through the clearance between the upper ends of the subreflecting surface 50c and the reflecting mirror 5 at the focal point O.

The angle γ1 of the light outgoing from the light-emitting diodes 34 and passing through the clearance between the lower end of the subreflecting surface 50c and the outer peripheral edge of the opening 20a at the focal point O is small. The angle γ2 of the light outgoing from the light-emitting diodes 34 and passing through the clearance between the upper ends of the subreflecting surface 50c and the reflecting mirror 5 at the focal point O is also small. The rotating lamp 200 directly radiates small part of γ1+γ2 in the total angle of emission β of the light emitted from the light emitter 1.

In other words, the rotating lamp 200 can utilize the light originally directly outwardly emitted from the light-emitting diodes 34 due to the auxiliary reflecting mirror 50, for improving the reflection efficiency.

Figure 15:
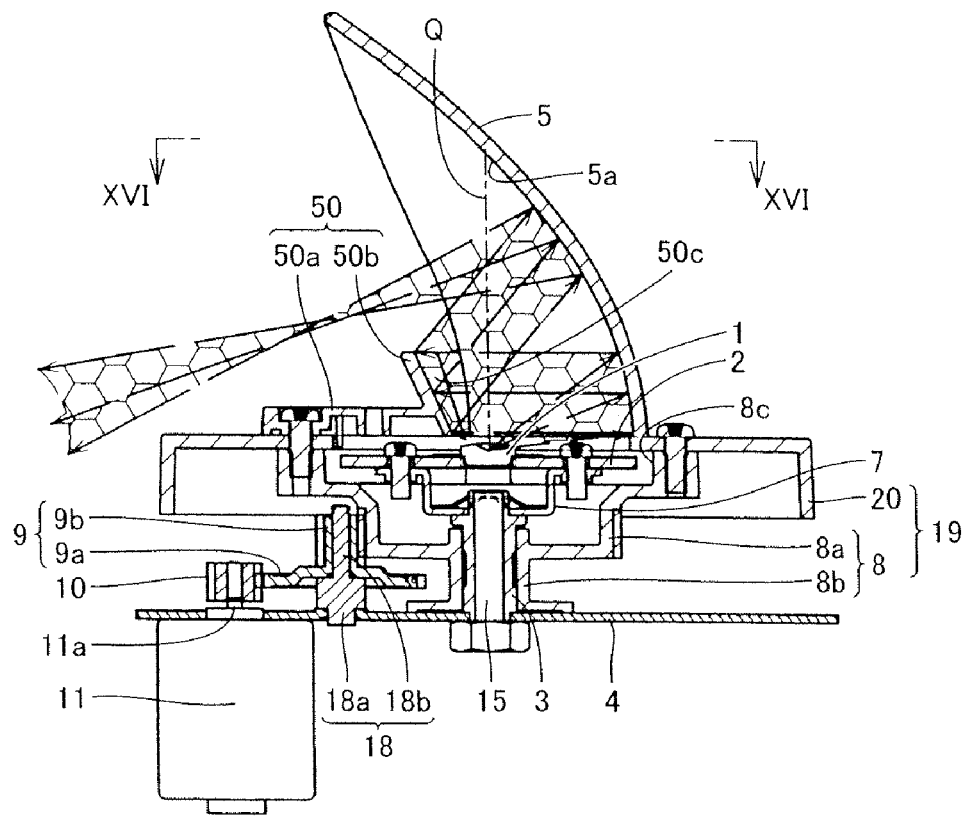
FIG. 15 is a side sectional view of the rotating lamp.

FIG. 15 is a side sectional view of the rotating lamp 200. As shown in FIG. 15, the reflecting mirror 5 horizontally reflects the light emitted from the light emitter 1 toward the lower end of the reflecting mirror 5. The subreflecting surface 50c reflects the light emitted from the light emitter 1 and reflected by the lower end of the reflecting mirror 5 toward the reflecting mirror 5. The reflecting mirror 5 reflects the light reflected by the subreflecting surface 50c again. The rotating lamp 200 radiates the light reflected by the reflecting mirror 5 again downward beyond the horizontal direction.

Thus, the rotating lamp 200 radiates the light emitted from the light emitter 1 and reciprocated between the subreflecting surface 50c and the reflecting surface 5a downward beyond the horizontal direction as viewed from a side portion. In other words, the quantity of the light radiated downward beyond the horizontal direction is increased as the height H of the subreflecting surface 50c is increased, while the quantity of light parallelized by the reflecting mirror 5 and radiated outward is reduced. Therefore, the height H of the subreflecting surface 50c is properly varied with the application, the set position etc. of the rotating lamp 200.

When it is necessary to deliver the light from the rotating lamp 200 to a distant place, the height H of the subreflecting surface 50c is set low. When it is necessary to ensure visibility from below by setting the rotating lamp 200 on a position higher than the human viewpoint, for example, the height H of the subreflecting surface 50c is set high.

Figure 16:
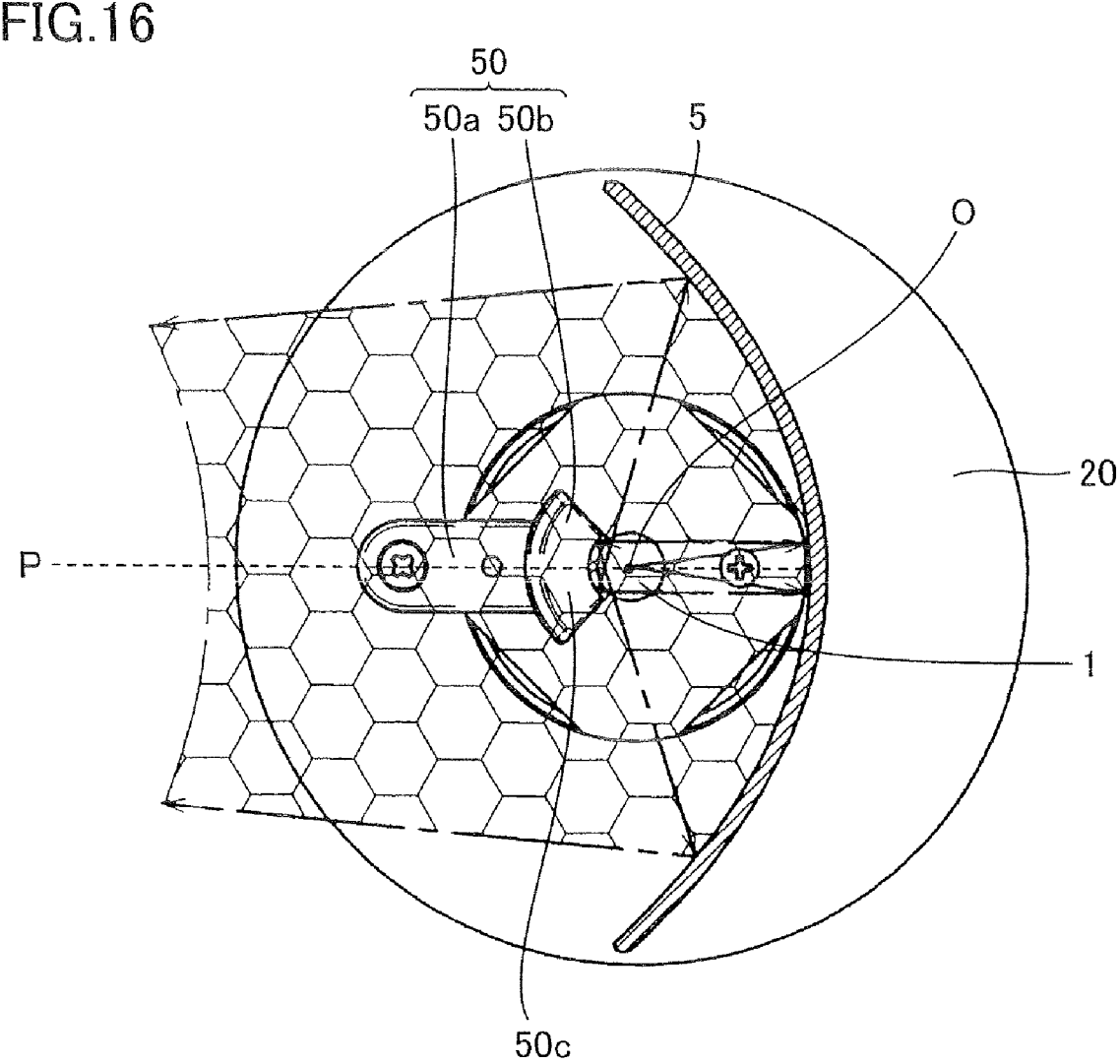
FIG. 16 is a sectional view taken along the line XVI-XVI in FIG. 15.

FIG. 16 is a sectional view taken along the line XVI-XVI in FIG. 15. As shown in FIG. 16, the light emitted from the light emitter 1 advances toward the reflecting mirror 5 as radiation. The reflecting mirror 5 reflects the light received from the light emitter 1 in parallel with the axis P. This parallel light is reflected by the subreflecting surface 50c, thereafter temporarily converged, and then diffused. The reflecting mirror 5 reflects the light reflected by the subreflecting surface 50c again. The light reflected by the reflecting mirror 5 again is converged on a position separated from the reflecting mirror 5.

The rotating lamp 200 according to the second embodiment can radiate the light downward for improving visibility from below by reflecting the light received from the light emitter 1 with the reflecting mirror 5, reflecting this reflected light with the auxiliary reflecting mirror 50 and further reflecting the light reflected by the auxiliary reflecting mirror 50 with the reflecting mirror 5 again. The auxiliary reflecting mirror 50 can reflect at least partial light emitted from the light emitter 1 but not directed toward the reflecting mirror 5 toward the reflecting mirror 5, for improving the reflection efficiency.

The rotating lamp 200 according to the second embodiment can also deliver the light, emitted from the light emitter 1 and directly reflected by the reflecting mirror 5 in a parallel manner, to a distant place similarly to the aforementioned first embodiment.

Further, the rotating lamp 200 according to the second embodiment, having the structure similar to that of the rotating lamp 100 according to the aforementioned first embodiment, can attain effects similar to those of the rotating lamp 100 according to the first embodiment.

Third Embodiment

A rotating lamp 300 according to a third embodiment of the present invention is described with reference to FIGS. 17 to 20.

Figure 17:
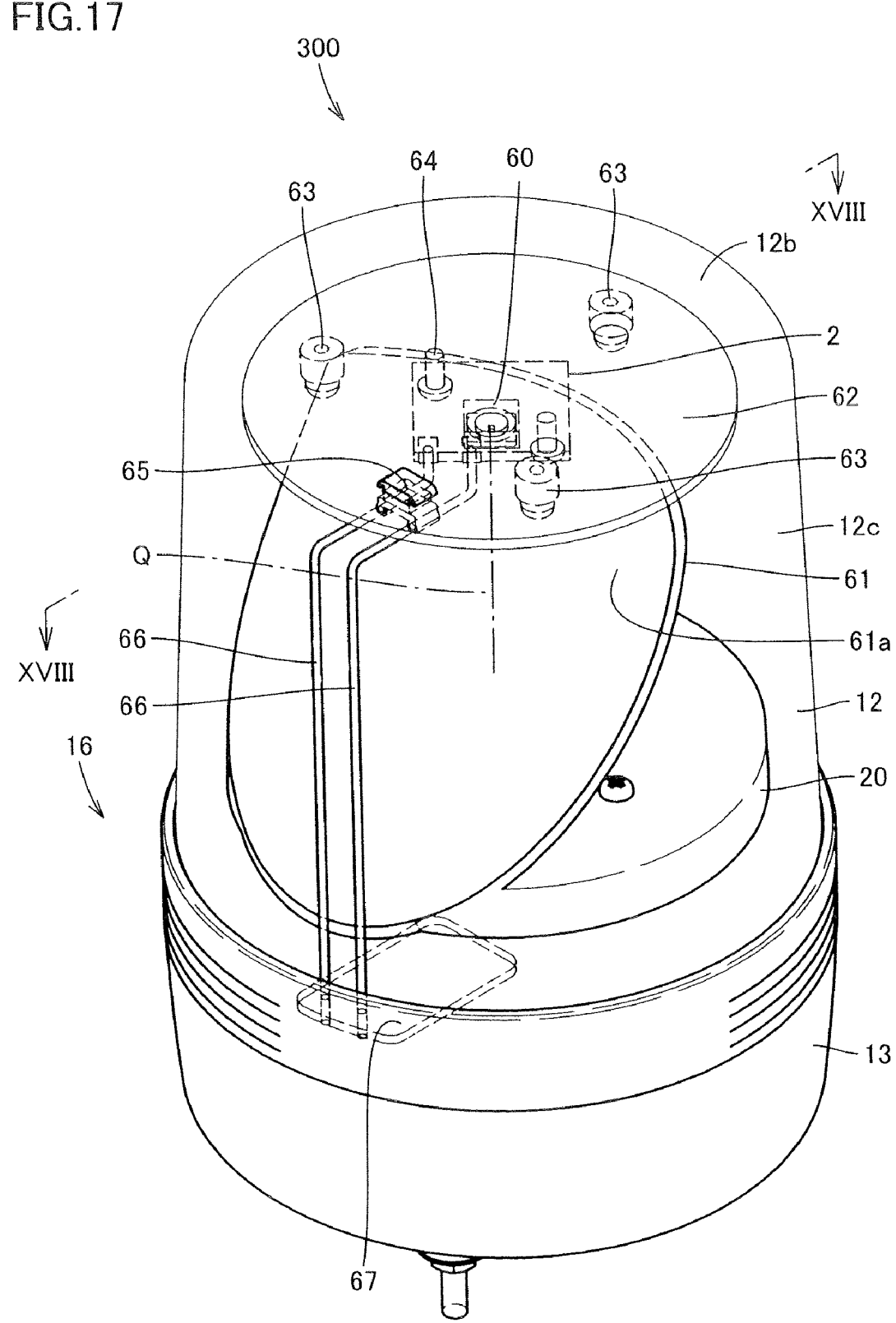
FIG. 17 is a perspective view of a rotating lamp according to a third embodiment of the present invention.

FIG. 17 is a perspective view of the rotating lamp 300 according to the third embodiment. As shown in FIG. 17, the rotating lamp 300 comprises a housing 16, a power LED 60 arranged in the housing 16 for serving as a light source, a printed board 2 on which the power LED 60 is arranged, a heat radiating portion 62 mounted with the power LED 60 through the printed board 2, a reflecting mirror 61 and a power supply portion 67.

A globe 12 includes a circular upper wall 12b and a peripheral wall 12c formed on the peripheral edge of the upper wall 12b. The heat radiating portion 62 is directly fixed to the upper wall 12b through a plurality of bosses 63. The heat radiating portion 62 is in the form of a circular plate, and fixed to the upper wall 12b with a small space. The printed board 2 is fixed to the surface of the heat radiating portion 62 closer to the inner side of the housing 16. The power LED 60 is fixed to a substantially central part of the printed board 2.

Lead wires 66 are provided between the power supply portion 67 and the printed board 2 for supplying electricity from the power supply portion 67 to the power LED 60. First ends of these lead wires 66 are connected to the printed board 2. Intermediate portions of the lead wires 66 extending from the printed board 2 toward the peripheral wall 12c of the globe 12 are held by a lead wire holding portion 65 on the side of the upper wall 12b. The lead wires 66 are suspended from the upper end toward the lower end of the peripheral wall 12c along the inner wall surface of the peripheral wall 12c, and connected to the power supply portion 67 on the lower ends thereof. The lead wires 66, covered with an insulating material, have small diameters. The power LED 60 serving as a light source is fixed to the upper wall 12b through the heat radiating portion 62, whereby no support portion or the like may be arranged for supporting the heat radiating portion 62 and the power LED 60 on the side of a body 13, not to suppress progress of light reflected by a reflecting surface 61a.

Figure 18:
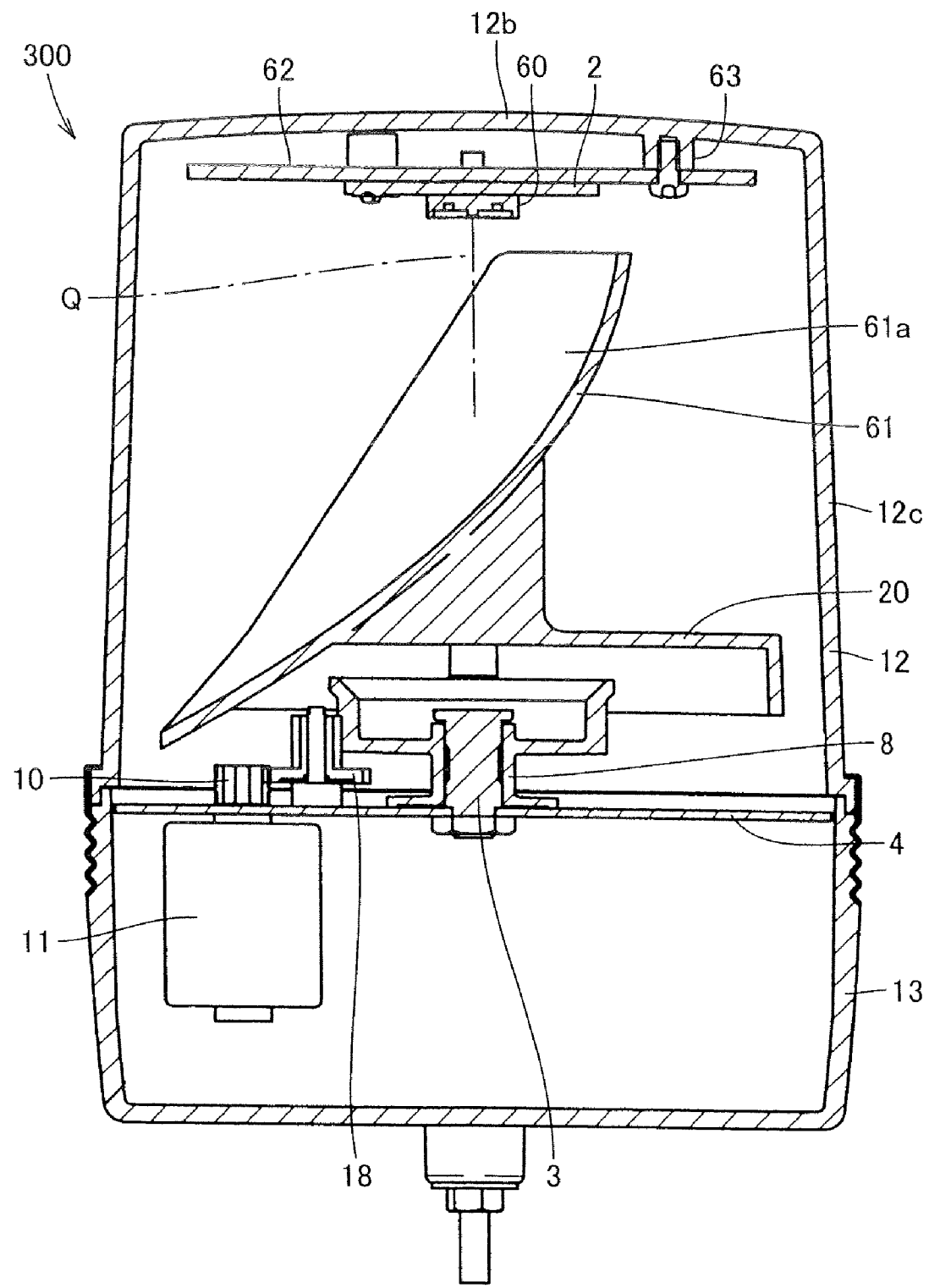
FIG. 18 is a sectional view taken along the line XVIII-XVIII in FIG. 17.

FIG. 18 is a sectional view taken along the line XVIII-XVIII in FIG. 17. As shown in FIG. 18, a shaft portion 3 is arranged on the upper surface of a chassis 4 for rotatably supporting a main gear 8, to which a base 20 is fixed. The reflecting mirror 61 is fixed to the upper surface of the base 20. According to the third embodiment, a driving mechanism for rotating the reflecting mirror 61 and the power LED 60 serving as a light source are separated from each other.

The heat radiating portion 62 for cooling the light source is arranged not in the driving mechanism but on a position separated from the driving mechanism, whereby a large space can be ensured for arranging the heat radiating portion 62. In other words, the driving mechanism is arranged on the side of the body 13 so that the heat radiating portion 62 is arranged substantially on the overall surface of the upper wall 12b.

Only the heat radiating portion 62 is arranged on the upper wall 12b, whereby a wide area can be ensured for a platelike member constituting the heat radiating portion 62. Further, the heat radiating portion 62 arranged on the overall surface of the upper wall 12b does not suppress progress of light reflected by the reflecting surface 61a and light received from the power LED 60 not passing through the upper wall 12b.

The reflecting mirror 61 is arranged under the power LED 60. This reflecting mirror 61 includes the reflecting surface 61a reflecting the light received from the power LED 60. The reflecting surface 61a of the reflecting mirror 61 is arranged gradually toward the upper wall 12b from a portion close to an opening 12a of the globe 12 inward. This reflecting surface 61a is substantially in the form of a paraboloid. In other words, the reflecting surface 61a is constituted of part of a paraboloid, and the power LED 60 is arranged on the focal position of the reflecting surface 61a. In the rotating lamp 300 according to the third embodiment, the reflecting surface 61a is arranged toward the upper wall 12b. The reflecting mirror 61 is formed to project frontward beyond the power LED 60 from behind the power LED 60 through a portion above the optical axis Q of the power LED 60.

The power LED 60 serving as a light source and the driving mechanism are so arranged independently of each other that the driving mechanism is compactly constituted, a motor 11 or the like is arranged in the vicinity of the shaft portion 3 and the height of the driving mechanism is reduced. Therefore, wide spaces are ensured above the base 20 and in the vicinity of the peripheral wall 12c respectively. The lower end of the reflecting mirror 61 is arranged downward beyond the upper surface of the base 20 in the wide space formed above the base 20. Therefore, a wide area is ensured for the reflecting surface 61a of the reflecting mirror 61.

The optical axis Q of the power LED 60 is arranged downward to intersect with the reflecting surface 61a. Further, the optical axis Q of the power LED 60 is arranged on or around the central axis of the shaft portion 3.

Figure 19:
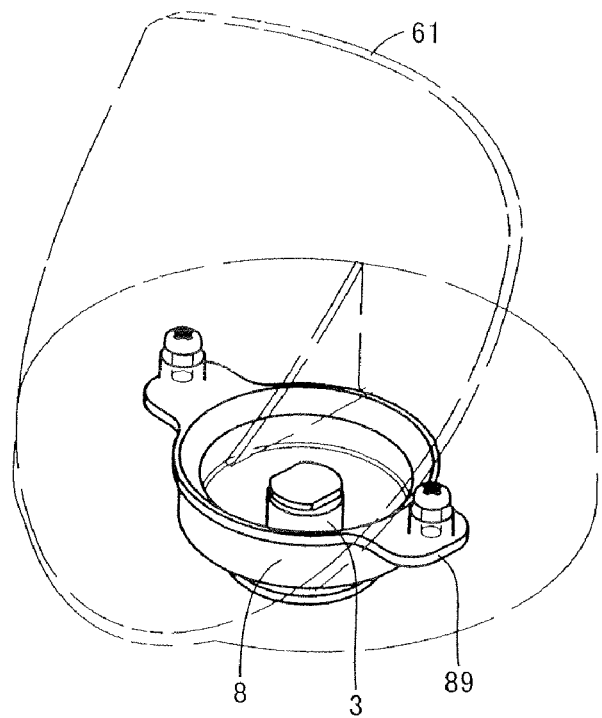
FIG. 19 is a perspective view showing a reflecting mirror and a main gear.

FIG. 19 is a perspective view showing the reflecting mirror 61 and the main gear 8. As shown in FIG. 19, the width of the reflecting mirror 61 is gradually increased upward from the base 20. The width of the reflecting mirror 61 is maximized on the upper end thereof. In other words, the upper end of the reflecting mirror 61 covers the side portion of the power LED 60 shown in FIG. 18.

Figure 20:
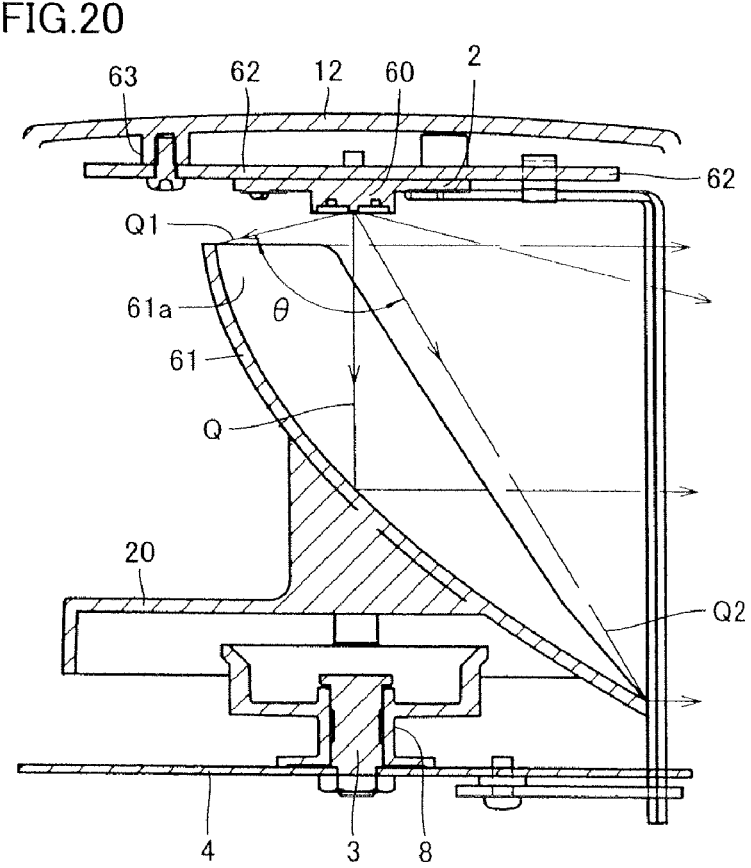
FIG. 20 is a sectional view showing the path of light emitted from a power LED.

FIG. 20 is a sectional view showing the path of the light from the power LED 60. The power LED 60 is arranged on the focal position of the reflecting surface 61a as shown in FIG. 20, so that the reflecting surface 61a parallelly reflects the light received from the power LED 60. The power LED 60 conically emits the light along the optical axis Q. The upper end of the reflecting mirror 61 is arranged on the path of light outgoing from the power LED 60 and passing through a position intersecting with the optical axis Q at the largest angle. A substantially central portion of the reflecting mirror 61 is arranged on or around the optical axis Q of the power LED 60, while the lower end of the reflecting mirror 61 extends toward the lower surface of the base 20. Thus, the reflecting surface 61a reflects the light received from the power LED 60 over a wide range. The reflecting surface 61a, arranged over a wide range from around the power LED 60 toward the lower surface of the base 20, ensures a wide sectional area for the path of the light reflected by the same.

When emitting light over a long time, the power LED 60 generates heat. The heat generated in the power LED 60 is first transferred to the printed board 2. The printed board 2, made of a material including a heat-transferable metallic material or the like, excellently dissipates the heat outward and transfers the same to the heat radiating portion 62. Substantially the overall surface of the printed board 2 is in contact with the heat radiating portion 62, for excellently transferring the heat to the heat radiating portion 62. The heat radiating portion 62 is formed by a platelike member substantially covering the overall surface of the upper wall 12b to ensure a wide contact area with the air, and made of a material including a heat-transferable metallic material for excellently dissipating the heat outward. Further, the heat radiating portion 62 is arranged to be slightly separated from the upper wall 12b, for excellently dissipating the heat also from the surface closer to the upper wall 12b. Thus, the heat generated from the power LED 60 is excellently dissipated outward through the printed board 2 and the heat radiating portion 62, so that the power LED 60 hardly stores the heat and is inhibited from reaching a high temperature.

The rotating lamp 300 according to the third embodiment, ensuring a wide area for the reflecting surface 61a, can improve reflection efficiency for the light emitted from the power LED 60.

Further, the rotating lamp 300 ensuring the area for the reflecting surface 61a can ensure a wide sectional area for the path of the light reflected by the reflecting surface 61a and improve visibility.

In addition, the rotating lamp 300 ensuring the contact area between the heat radiating portion 62 and the printed substrate 2 can excellently transfer the heat from the power LED 60 to the heat radiating portion 62 and dissipate the heat through the heat radiating portion 62 having excellent heat radiation efficiency, for excellently cooling the power LED 60. Thus, the life of the power LED 60 serving as a light source can be elongated.

Fourth Embodiment

A rotating lamp 400 according to a fourth embodiment of the present invention is described with reference to FIGS. 21 and 22.

Figure 21:
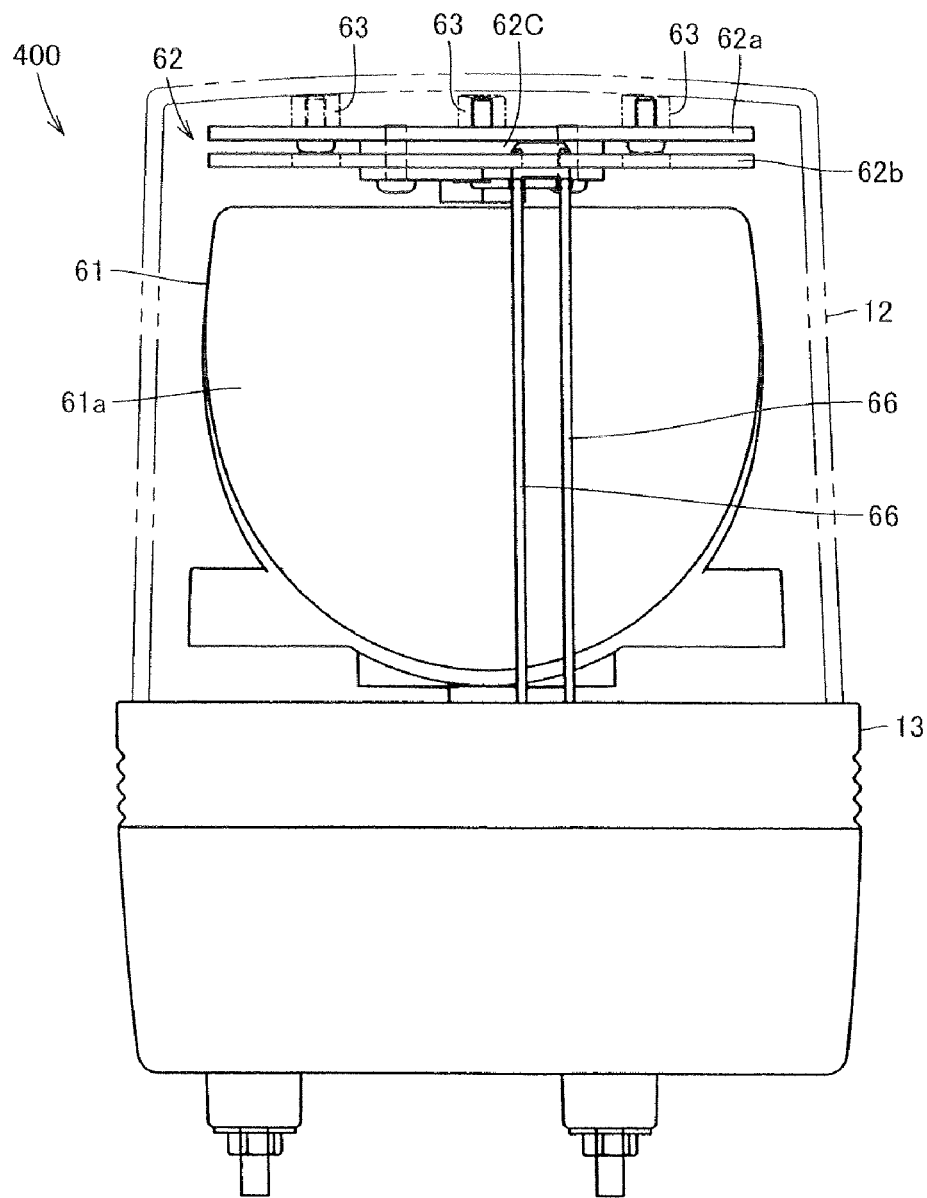
FIG. 21 is a partially fragmented side elevational view showing a rotating lamp according to a fourth embodiment of the present invention.

FIG. 21 is a partially fragmented side elevational view of the rotating lamp 400 according to the fourth embodiment. As shown in FIG. 21, a heat radiating portion 62 and a driving mechanism driving a reflecting mirror 61 are separately arranged also in the rotating lamp 400 according to the fourth embodiment. In other words, the heat radiating portion 62 is arranged on the inner wall surface of an upper wall 12b of a globe 12.

Figure 22:
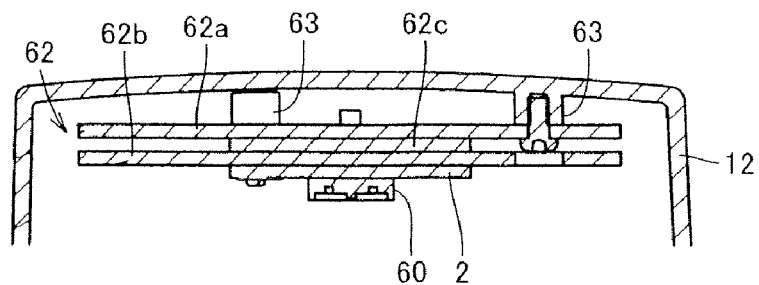
FIG. 22 is a sectional view of a portion around a heat radiating portion of the rotating lamp shown in FIG. 21.

FIG. 22 is a sectional view of a portion around the heat radiating portion 62 of the rotating lamp 400 shown in FIG. 21. As shown in FIG. 22, the heat radiating portion 62 includes a radiator plate 62a fixed to the inner wall surface of the upper wall 12b, another radiator plate 62c arranged on the lower surface of the radiator plate 62a with an area smaller than that of the radiator plate 62a and still another radiator plate 62b arranged on the lower surface of the radiator plate 62c with an area larger than that of the radiator plate 62c. In other words, the heat radiating portion 62 is formed by superposing platelike members having different areas with each other, for ensuring a surface area for coming into contact with the air. The radiator plate 62c is substantially identical in size to a printed board 2. The radiator plate 62a closer to the upper wall 12b is fixed to the upper wall 12b in a state slightly separated therefrom. The heat radiating portion 62 may alternatively be formed by stacking radiator plates 62a and 62b covering the upper wall 12b and still another radiator plate 62c having an area smaller than those of the radiator plates 62a and 62b with each other. The remaining structure of the rotating lamp 400 is similar to that of the rotating lamp 300 according to the aforementioned third embodiment, and elements similar to those of the third embodiment are denoted by the same reference numerals, not to repeat redundant description.

In the rotating lamp 400 having the aforementioned structure, heat generated from a power LED 60 is transferred to the printed board 2. The heat received by the printed board 2 is transferred to the radiator plate 62b substantially from the overall upper surface of the printed board 2. The heat received by the radiator plate 62b is transferred to the radiator plate 62c substantially from the overall lower surface of the radiator plate 62c. The heat received by the radiator plate 62c is transferred to the radiator plate 62a substantially from the overall upper surface of the radiator plate 62c. Thus, the heat is excellently transferred from the radiator plate 62b to the radiator plate 62c and from the radiator plate 62c to the radiator plate 62a through the surfaces of the radiator plate 62c.

The rotating lamp 400 having the aforementioned structure can increase the quantity of heat dissipated from the heat radiating portion 62 outward due to the large surface area of the heat radiating portion 62. Thus, the rotating lamp 400 can excellently cool the power LED 60. In addition, the heat generated in the power LED 60 can be excellently transferred to the radiator plates 62*a* to 62*c* and excellently dissipated outward through the radiator plates 62*a* to 62*c*.

Fifth Embodiment

Figure 23:
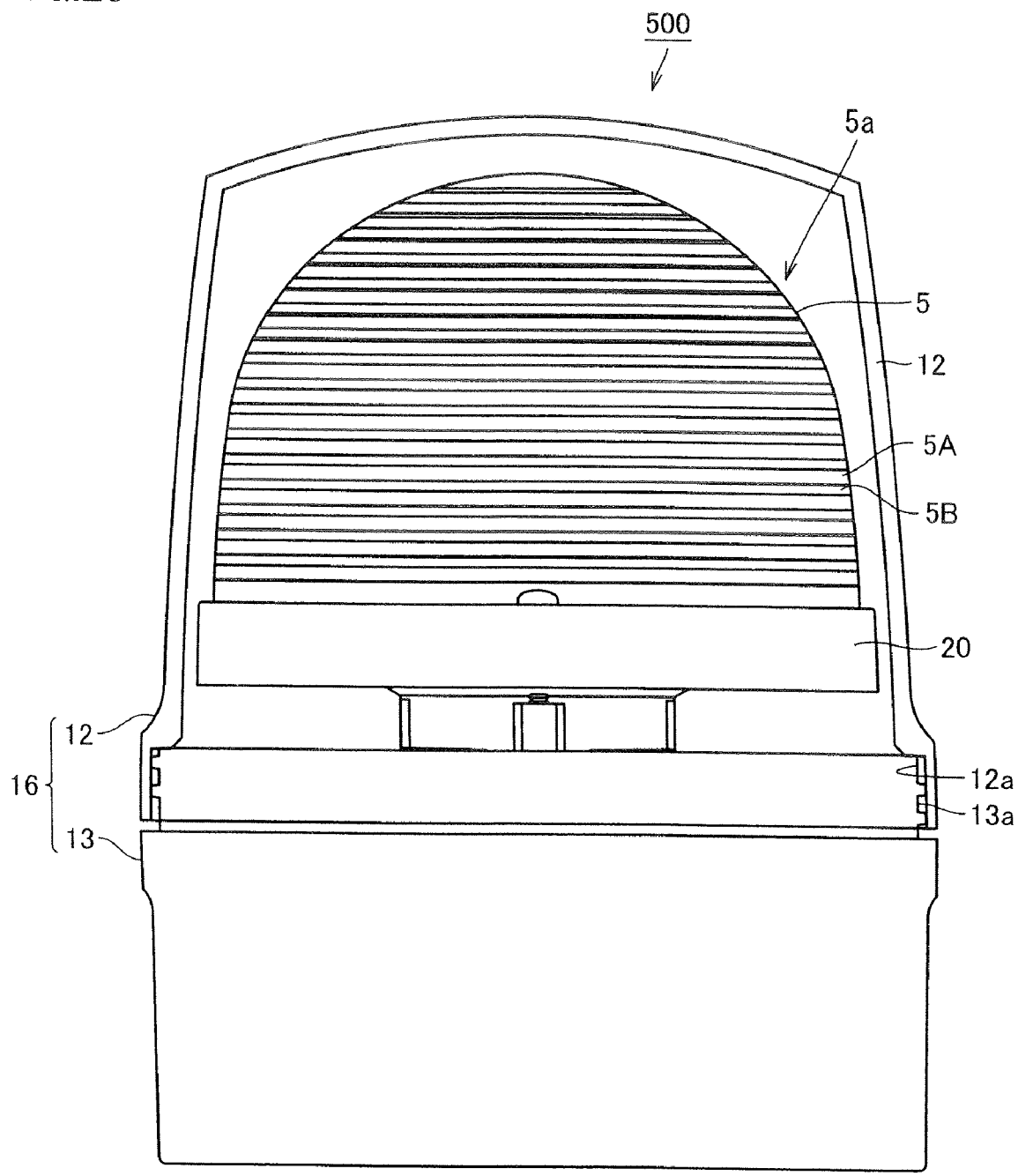
FIG. 23 is a front elevational view of a rotating lamp according to a fifth embodiment of the present invention.

A rotating lamp 500 according to a fifth embodiment of the present invention is described with reference to FIGS. 23 to 27. Elements similar to those of the aforementioned first embodiment are denoted by the same reference numerals, not to repeat redundant description. FIG. 23 is a front elevational view of the rotating lamp 500 according to the fifth embodiment. As shown in FIG. 23, a plurality of recesses 5A and a plurality of projections 5B are formed substantially on the overall surface of a reflecting surface 5*a* of the rotating lamp 500. The recesses 5A and the projections 5B extend perpendicularly to the rotational axis of a reflecting mirror 5A, for example, to intersect with the rotational axis. The plurality of recesses 5A and the plurality of projections 5B are alternately formed toward the rotational axis of the reflecting mirror 5. Thus, the reflecting surface 5*a* formed with the plurality of recesses 5A and the plurality of projections 5B reflects light outgoing from a power LED 60 and hitting the reflecting surface 5*a* in various directions.

Figure 24:
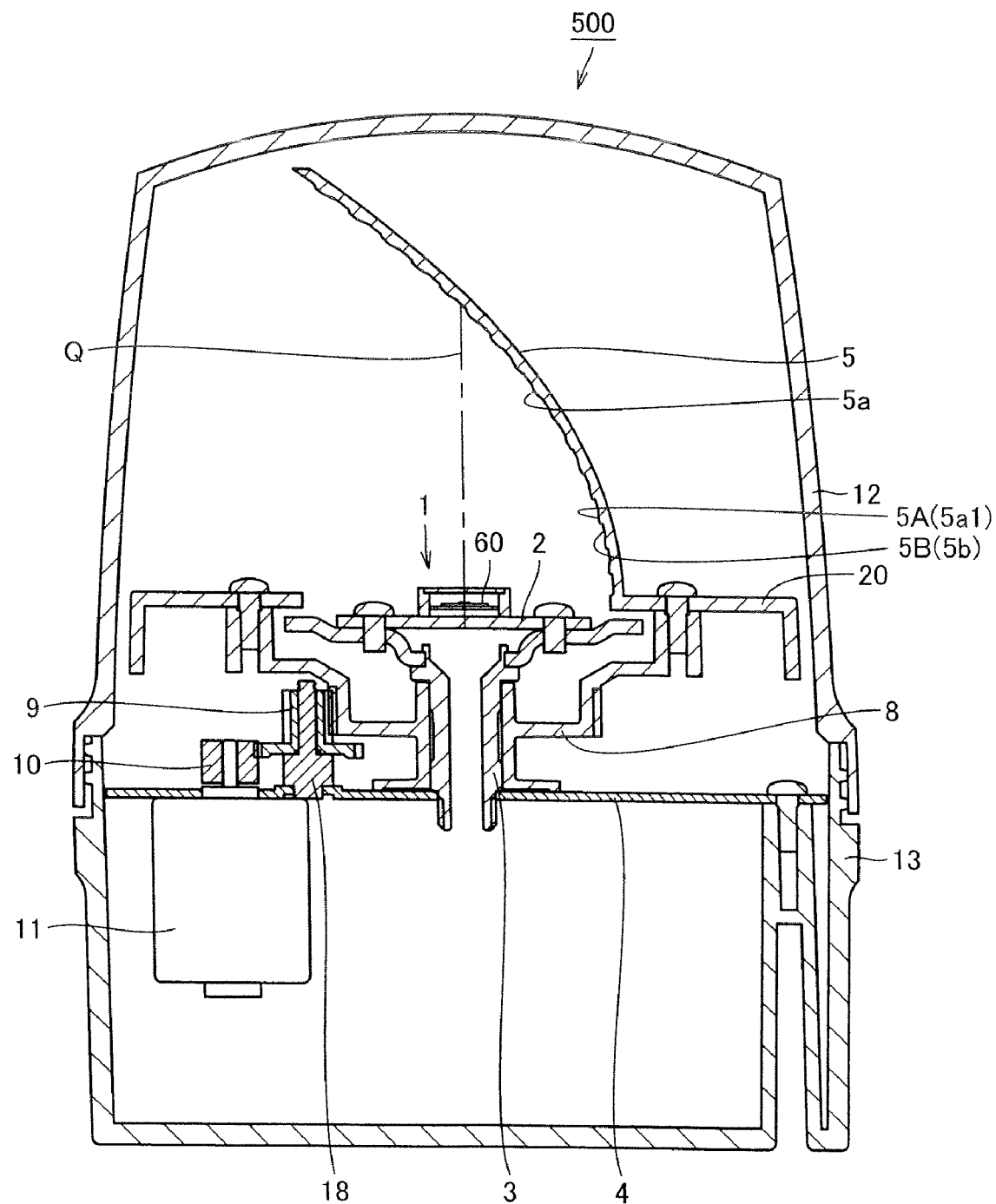
FIG. 24 is a side sectional view of the rotating lamp shown in FIG. 23.
Figure 25:
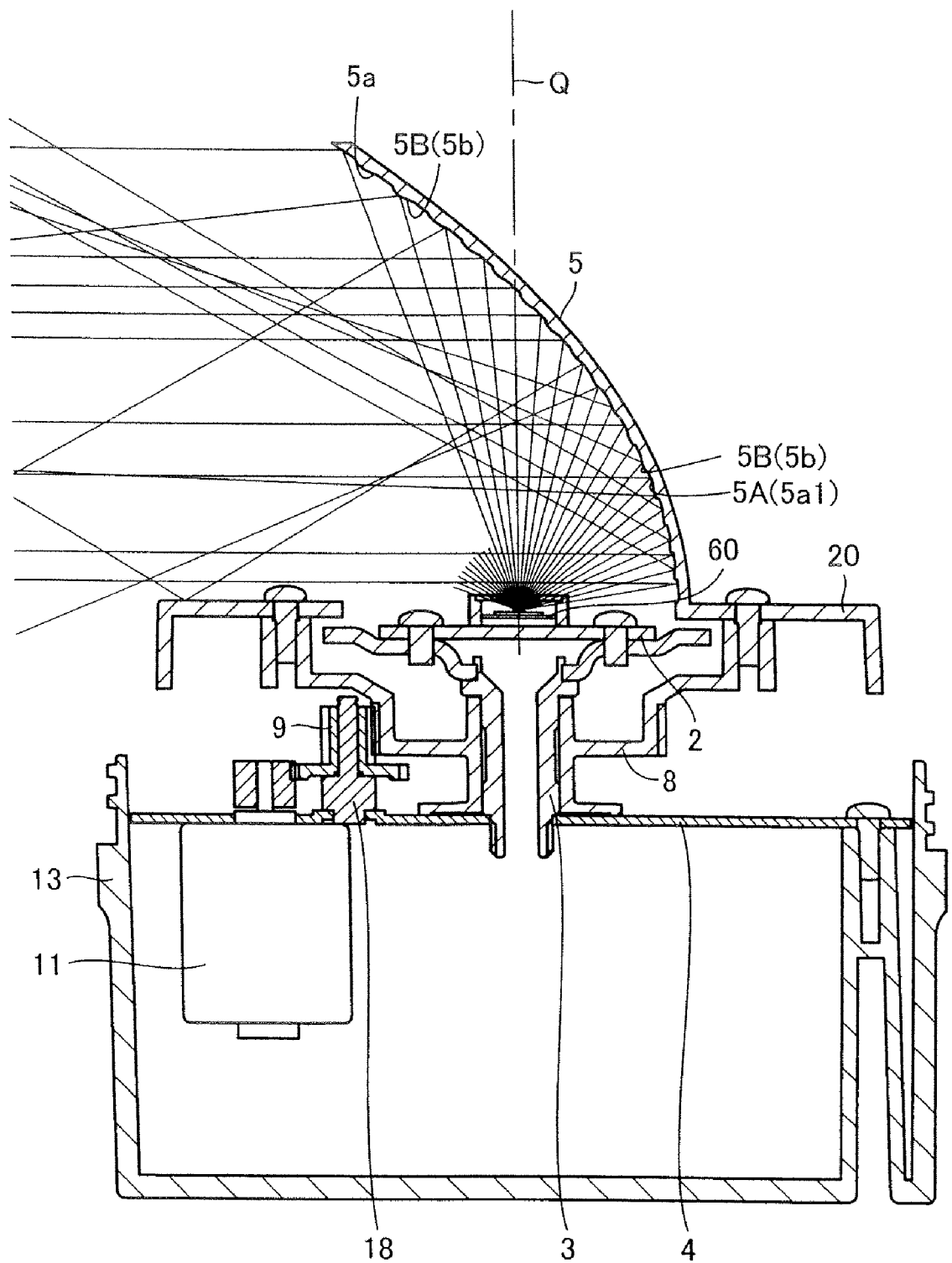
FIG. 25 is a side sectional view showing the path of light emitted from a power LED.
Figure 26:
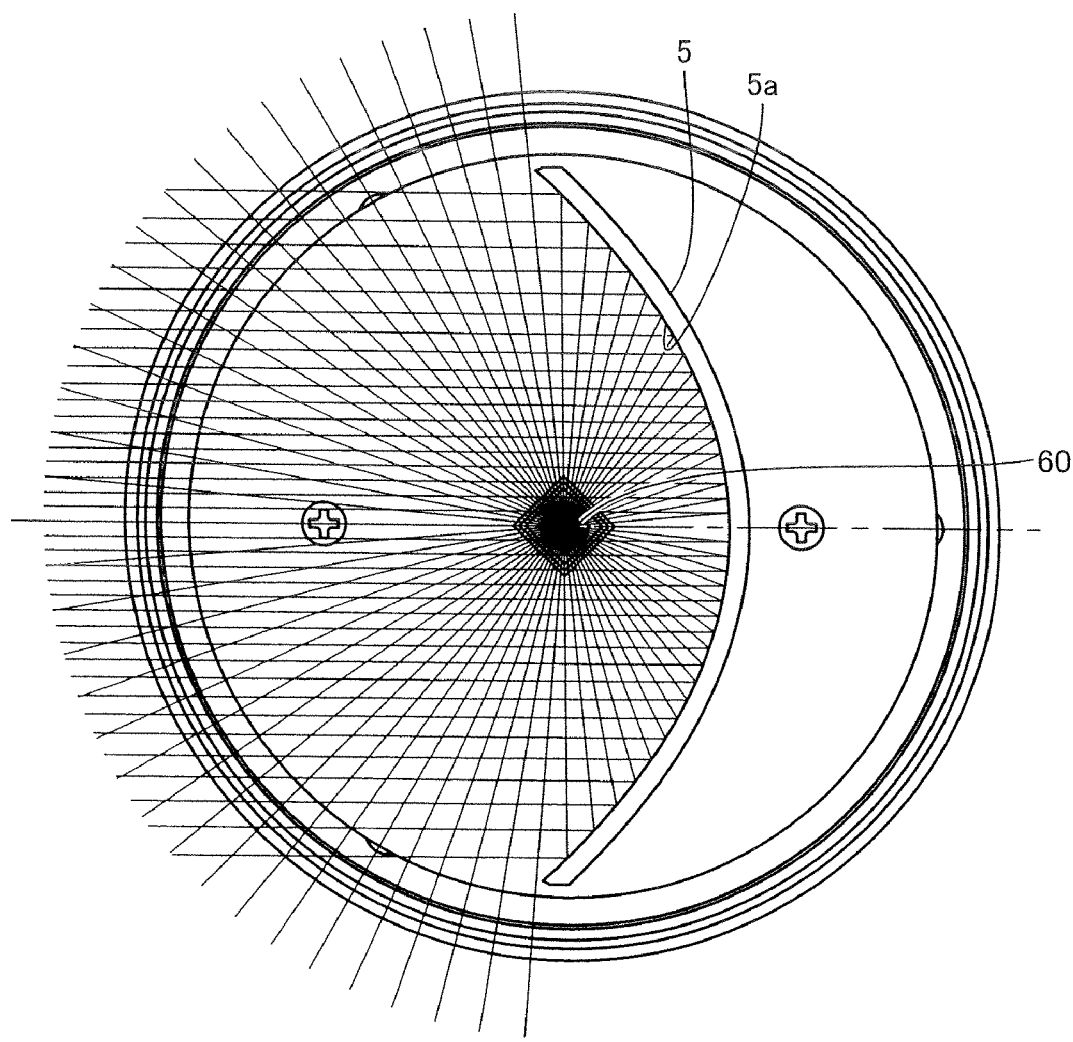
FIG. 26 is a partially fragmented plan view of a reflecting mirror of the rotating lamp.

FIG. 24 is a side sectional view of the rotating lamp 500 shown in FIG. 23. Referring to FIG. 24, reflecting surfaces (first reflecting surfaces) 5*a*1 located on the surfaces of the recesses 5A formed on the reflecting surface 5*a* are in the form of paraboloids, while reflecting surfaces 5*b* located on the surfaces of the projections 5B area arranged in directions intersecting with the paraboloids. A light emitter 1 having the power LED 60 is arranged on the focal points O of the parabolic reflecting surfaces 5*a*1. FIG. 25 is a side elevational view showing the path of the light emitted from the power LED 60, and FIG. 26 is a partially fragmented plan view of the reflecting mirror 5 of the rotating lamp 500. Both of these figures show the state of reflection of the light emitted from the light emitter 1. When a body 13 is horizontally arranged, the light emitted from the power LED 60 radially spreads and is horizontally reflected by the reflecting surfaces 5*a*1 of the recesses 5A in a parallel manner, as shown in FIGS. 25 and 26.

When hitting the reflecting surfaces 5*b* of the projections 5B, on the other hand, the light emitted from the power LED 60 is reflected to intersect with the light reflected by the reflecting surfaces 5*a*1, as shown in FIG. 25. Therefore, the light emitted from the power LED 60 is reflected by the reflected mirror 5 both in the parallel direction and the direction perpendicular thereto, whereby the rotating lamp 500 can ensure visibility on the front surface thereof and a position slightly deviating therefrom.

Figure 27:
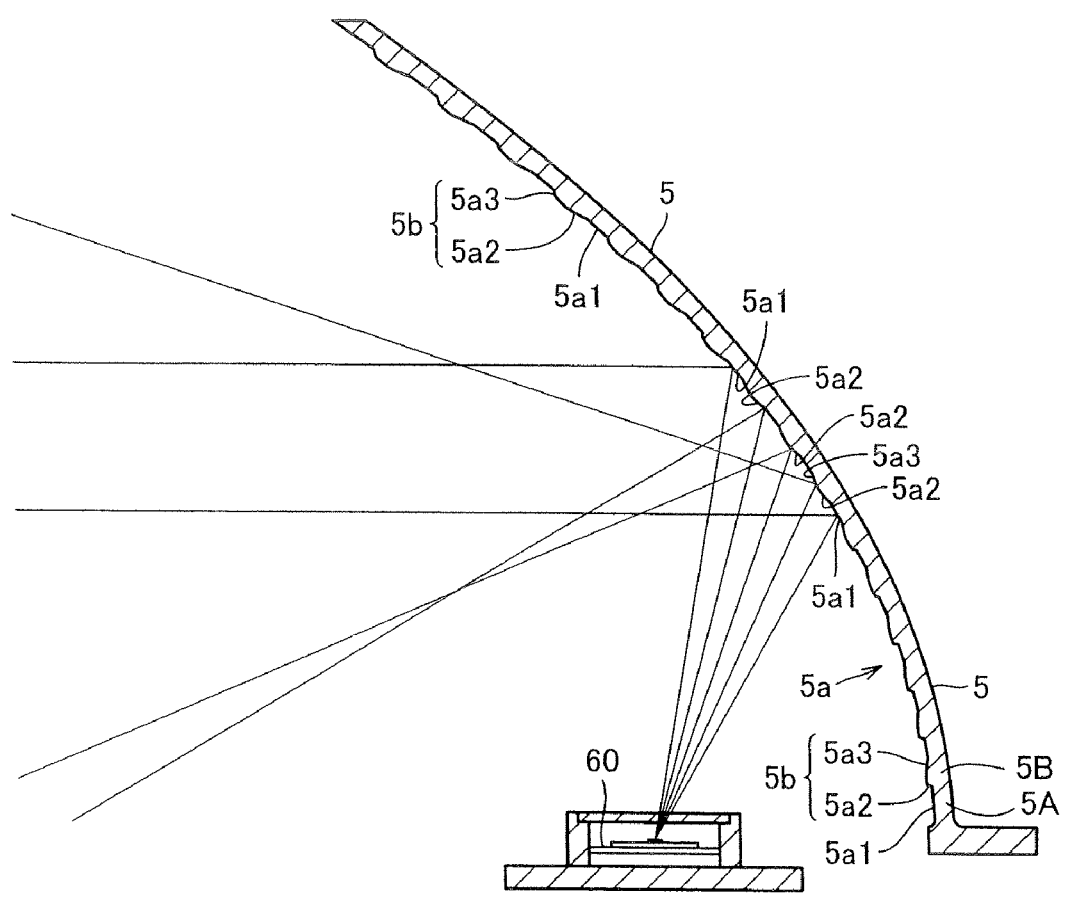
FIG. 27 is an enlarged sectional view of the reflecting mirror.

FIG. 27 is an enlarged sectional view of the reflecting mirror 5 showing the path of the light emitted from the power LED 60. As shown in FIG. 27, the reflecting surface 5*a* includes the parabolic reflecting surfaces 5*a*1 and reflecting surfaces 5*a*2 and 5*a*3 arranged on both sides of the reflecting surfaces 5*a*1 respectively. The reflecting surfaces 5*a*1, 5*a*2 and 5*a*3 are successively alternately arranged from the side of a substrate 13 shown in FIG. 25 toward the upper end of the reflecting mirror 5. The reflecting surfaces 5*a*2 and 5*a*3 are formed on the surfaces of the projections 5B, and the reflecting surfaces 5*a*2 are arranged oppositely to the reflecting surfaces 5*a*3 with respect to the reflecting surfaces 5*a*1.

The reflecting surfaces 5*a*2 are more inclined toward the power LED 60 than the adjacent reflecting surfaces 5*a*1 from the substrate 13 shown in FIG. 25 toward the upper end of the reflecting mirror 5.

Therefore, the reflecting surfaces 5*a*2 reflect the light received from the power LED 60 more toward the substrate 13 shown in FIG. 25 than the light reflected by the reflecting surfaces 5*a*1. When the substrate 13 is horizontally arranged, the reflecting surfaces 5*a*2 reflect the light downward beyond the horizontal direction. Therefore, the rotating lamp 500 can ensure visibility from below also when the same is arranged above the line of sight of an observer.

The widths of the reflecting surfaces 5*a*2 and 5*a*3 are reduced and increased respectively from the substrate 13 toward the upper end of the reflecting mirror 5.

Therefore, the areas of the reflecting surfaces 5*a*2 closer to the substrate 13 shown in FIG. 13 are smaller than those of the reflecting surfaces 5*a*2 closer to the upper end of the reflecting mirror 5, while the areas of the reflecting surfaces 5*a*3 closer to the upper end of the reflecting mirror 5 are smaller than those of the reflecting surfaces 5*a*3 closer to the substrate 13.

Thus, a rotatable member 8 and the substrate 13 shown in FIG. 25 are inhibited from blocking downwardly directed reflected light, so that the rotating lamp 500 can excellently radiate the reflected light downward. Further, reflected light directed toward the upper end of the reflecting mirror 5 beyond parallel light is widely ensured on the side of the reflecting mirror 5 closer to the substrate 13, whereby the rotating lamp 500 can also ensure visibility from above.

On the other hand, the widths of the reflecting surfaces 5*a*1 are substantially uniform from the substrate 13 toward the upper end of the reflecting mirror 5, regardless of the positions of the reflecting surfaces 5*a*1. Therefore, the rotating lamp 500 substantially uniformly radiates parallel light substantially from the overall reflecting surface 5*a* toward the substrate 13. This parallel light can reach a distant place, whereby the rotating lamp 500 can also ensure visibility from the front surface also in the distant place.

Sixth Embodiment

Figure 28:
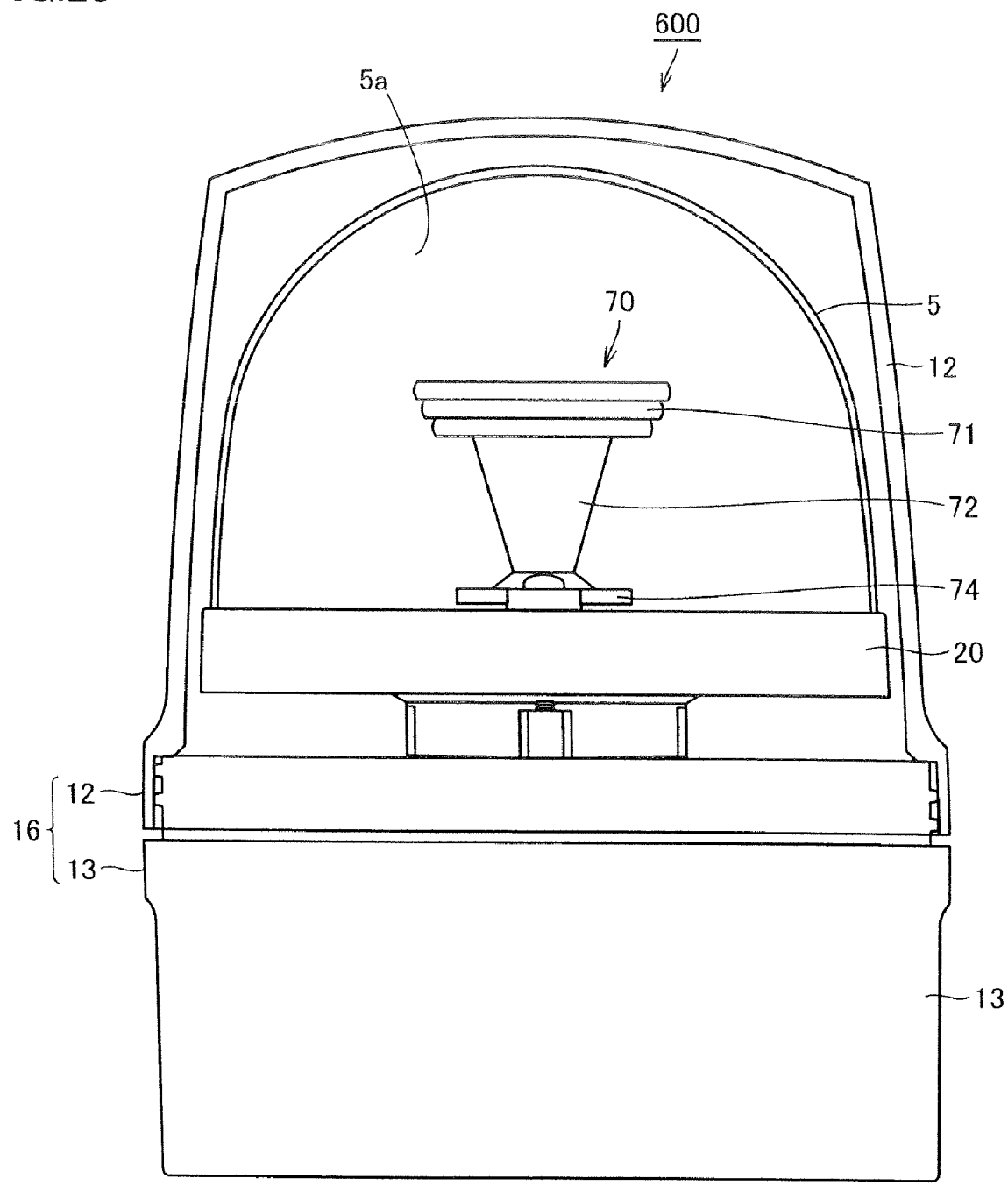
FIG. 28 is a front elevational view of a rotating lamp according to a sixth embodiment of the present invention.

A rotating lamp 600 according to a sixth embodiment of the present invention is described with reference to FIGS. 28 to 32. Elements similar to those of the rotating lamp 100 according to the aforementioned first embodiment are denoted by the same reference numerals, not to repeat redundant description. FIG. 28 is a front elevational view of the rotating lamp 600 according to the sixth embodiment. The rotating lamp 600 includes a transparent light guide 70 arranged in a globe 12, as shown in FIG. 28. This light guide 70 is made of a transparent resin material such as acrylic or polycarbonate or a transparent nonplastic material such as glass.

Thus, the light guide 70 is so formed by a transparent member that the rotating lamp 600 can inhibit the light guide 70 from blocking light reflected by a reflecting surface 5*a*. Therefore, the rotating lamp 600 can ensure visibility with the light reflected by the reflecting surface 5*a*.

Figure 29:
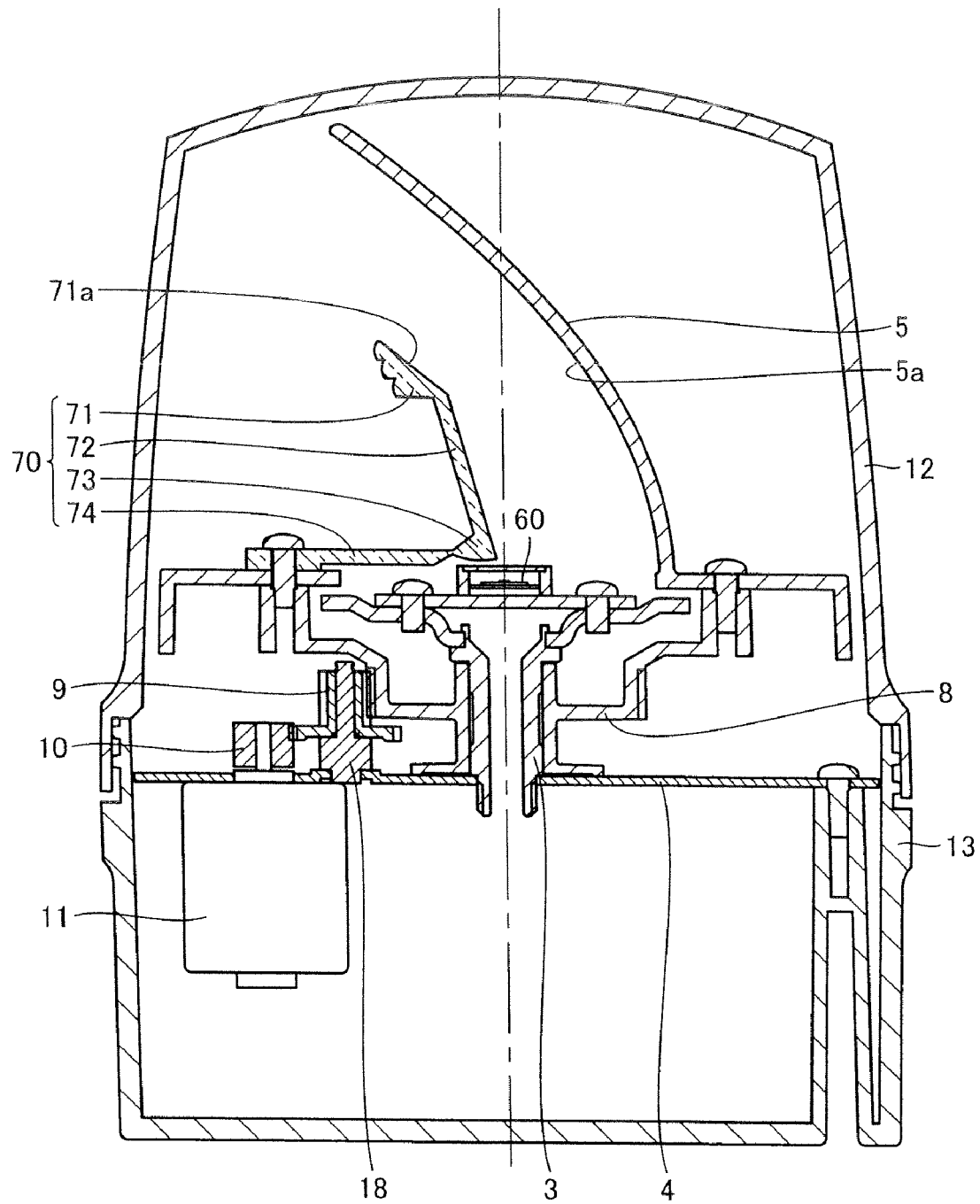
FIG. 29 is a side sectional view of the rotating lamp.
Figure 30:
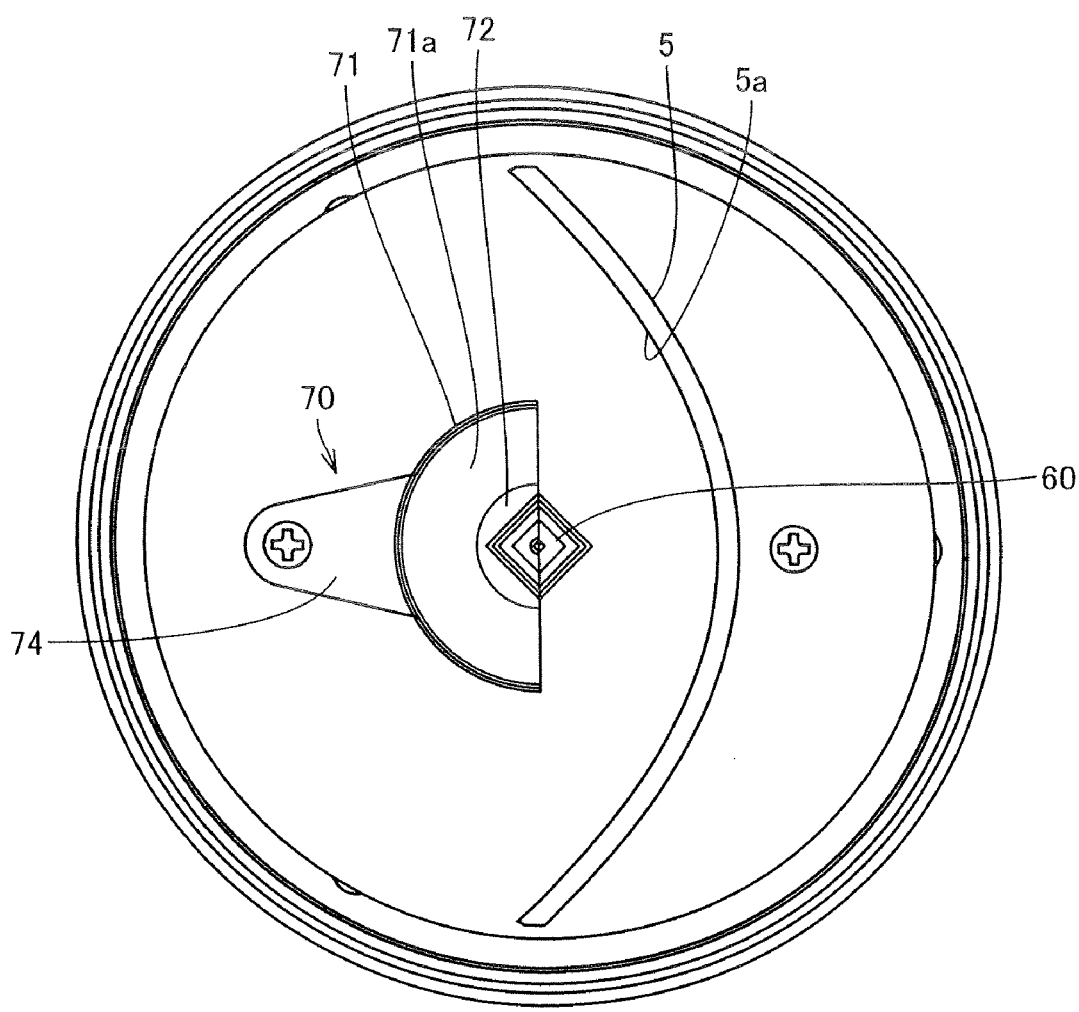
FIG. 30 is a partially fragmented plan view of a reflecting mirror of the rotating lamp.

FIG. 29 is a side sectional view of the rotating lamp 600, and FIG. 30 is a partially fragmented top plan view of a reflecting mirror 5 of the rotating lamp 600. As shown in FIG. 29, the light guide 70 includes a fixed portion 74 fixed to the upper surface of a base 20 to extend toward a power LED 60, a neck portion 72 provided on the fixed portion 74 and arranged on the upper surface of the power LED 60, a condensing portion 73 formed on the lower end of the neck portion 72 and a scattering portion 71 provided on the forward end of the neck portion 72.

As shown in FIGS. 29 and 30, the scattering portion 71 semicircularly extends and projects from the forward end of the neck portion 72 oppositely to the reflecting surface 5*a*. A reflecting surface 71a of the scattering portion 71 closer to the reflecting surface 5a is in the form of a semicircular truncated cone.

Figure 31:
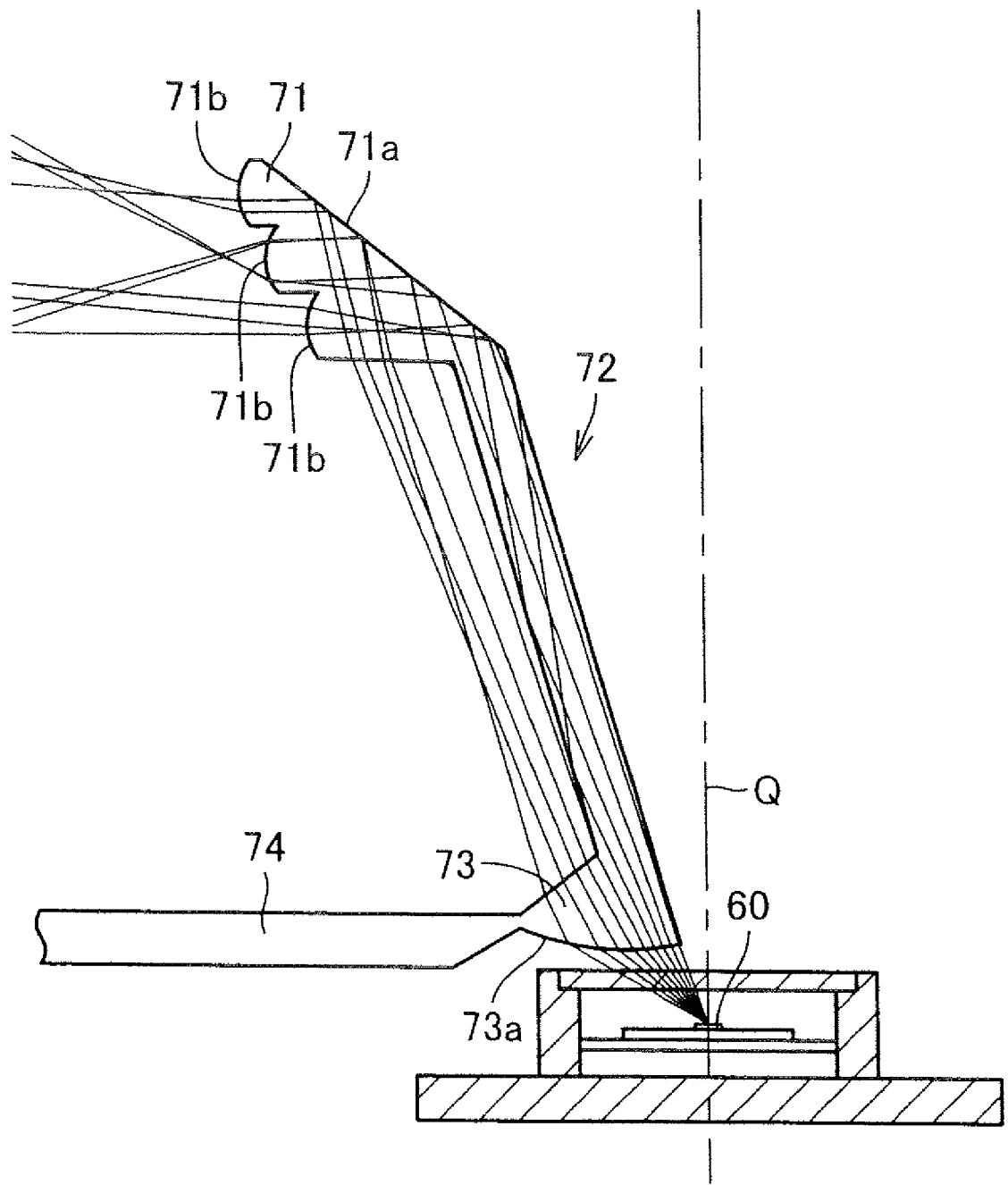
FIG. 31 is an enlarged sectional view of a light guide.

FIG. 31 is an enlarged sectional view of the light guide 70. As shown in FIGS. 31 and 29, a surface of the condensing portion 73 opposed to the power LED 60 is formed by a convex lens 73a, for example, and the condensing portion 73 is located oppositely to the reflecting surface 5a with respect to the optical axis Q of the power LED 60.

Therefore, the condensing portion 73 can condense part of light emitted from the power LED 60 not hitting the reflecting surface 5a, for improving utilization efficiency for the light emitted from the power LED 60. The convex lens 73a bends the light received from the power LED 60 toward the neck portion 72 and the scattering portion 71. While the surface of the condensing portion 73 opposed to the power LED 70 is formed by the convex lens 73a in the sixth embodiment, the present invention is not restricted to this. In other words, this surface may alternatively be formed by a plane lens or a concave lens so far as the same can bend the light received from the power LED 60 toward the neck portion 72 and the scattering portion 71.

The light supplied from the power LED 60 to the neck portion 72 is reflected by the neck portion 72 and guided to the scattering portion 71. The angle of inclination of the reflecting surface 71a is set to be capable of totally reflecting the light received from the neck portion 72, and properly set in response to the member constituting the light guide 70.

A plurality of convex lenses 71b are formed on the surface of the scattering portion 71 opposite to the reflecting surface 71a. These convex lenses 71b scatter the light reflected by the reflecting surface 71a perpendicularly to parallel light reflected by the reflecting surface 5a shown in FIG. 29. Thus, the rotating lamp 600, capable of scattering the light received from the power LED 60 on the scattering portion 71, can ensure visibility not only from the front surface of the rotating lamp 60 but also from below and from above the same.

The light guide 70 is uprightly provided on the power LED 60 and the scattering portion 71 is arranged closer to the upper end of the reflecting mirror 5 than the base 20, whereby the scattering portion 71 can be visually recognized not only from the front surface of the rotating lamp 600 but also from below the same. Thus, an observer can excellently visually recognize the light from the scattering portion 71 also when observing the rotating lamp 600 from below, and the rotating lamp 600 is improved in visibility from below.

It seems to the observer observing the power LED 60 through the light guide 70 as if the scattering portion 71 itself emits light.

The size of the virtual light source formed by the scattering portion 71 can be ensured due to the plurality of lenses 71b for scattering light stacked with each other from the substrate 13 toward the upper end of the reflecting mirror 5.

The lenses 71b are formed to project oppositely to the reflecting mirror 5 shown in FIG. 29 from the substrate 13 toward the upper end of the reflecting mirror 5. The reflecting surface 71a is inclined oppositely to the reflecting mirror 5 from the substrate 13 toward the upper end of the reflecting mirror 5, whereby the scattering portion 71 has a substantially uniform thickness in the horizontal direction from the substrate 13 toward the upper end of the reflecting mirror 5.

Thus, the light guide 70 can be excellently manufactured by a technique such as extrusion molding so that the same can be substantially uniformly cooled due to the substantially uniform thickness of the scattering portion 71.

As shown in FIG. 29, the neck portion 72 of the light guide 70 is inclined oppositely to the reflecting surface 5a with respect to the optical axis Q. Thus, a shadow of the light guide 70 formed on the reflecting surface 5a can be located on the upper end of the reflecting surface 5a due to the inclined neck portion 72. In other words, the light guide 70 blocks the light received from the power LED 60 against the reflecting surface 5a located on a straight line connecting the power LED 60 and the light guide 70 with each other, to weaken the reflected light on this portion. The weakened portion of the reflected light is so located on the upper end of the reflecting mirror 5 that the same is inconspicuous.

The light guide 70 is located outward beyond a region defined by a plane connecting the power LED 60 and the upper end of the reflecting mirror 5 and the reflecting surface 5a with respect to the reflecting mirror 5, so that the reflecting surface 5a can be inhibited from receiving the shadow of the light guide 70 and forming the weakened portion of the light reflected by the reflecting surface 5a. The light guide 70 is so arranged to extend on the center line of a shaft portion 3 shown in FIG. 29 that the same seems to be located on a constant position upon driving of the rotating lamp 600. While the neck portion 72 has a conical shape according to the sixth embodiment, the present invention is not restricted to this but the neck portion 72 may alternately have a semicylindrical shape having a substantially constant width in the horizontal direction from the substrate 13 toward the upper end of the reflecting mirror 5, for example. Thus, the light guide 70 can be excellently manufactured so that the same can be substantially uniformly cooled due to the substantially uniform thickness of the neck portion 72 in the horizontal direction from the substrate 13 toward the upper end of the reflecting mirror 5.

Figure 32:
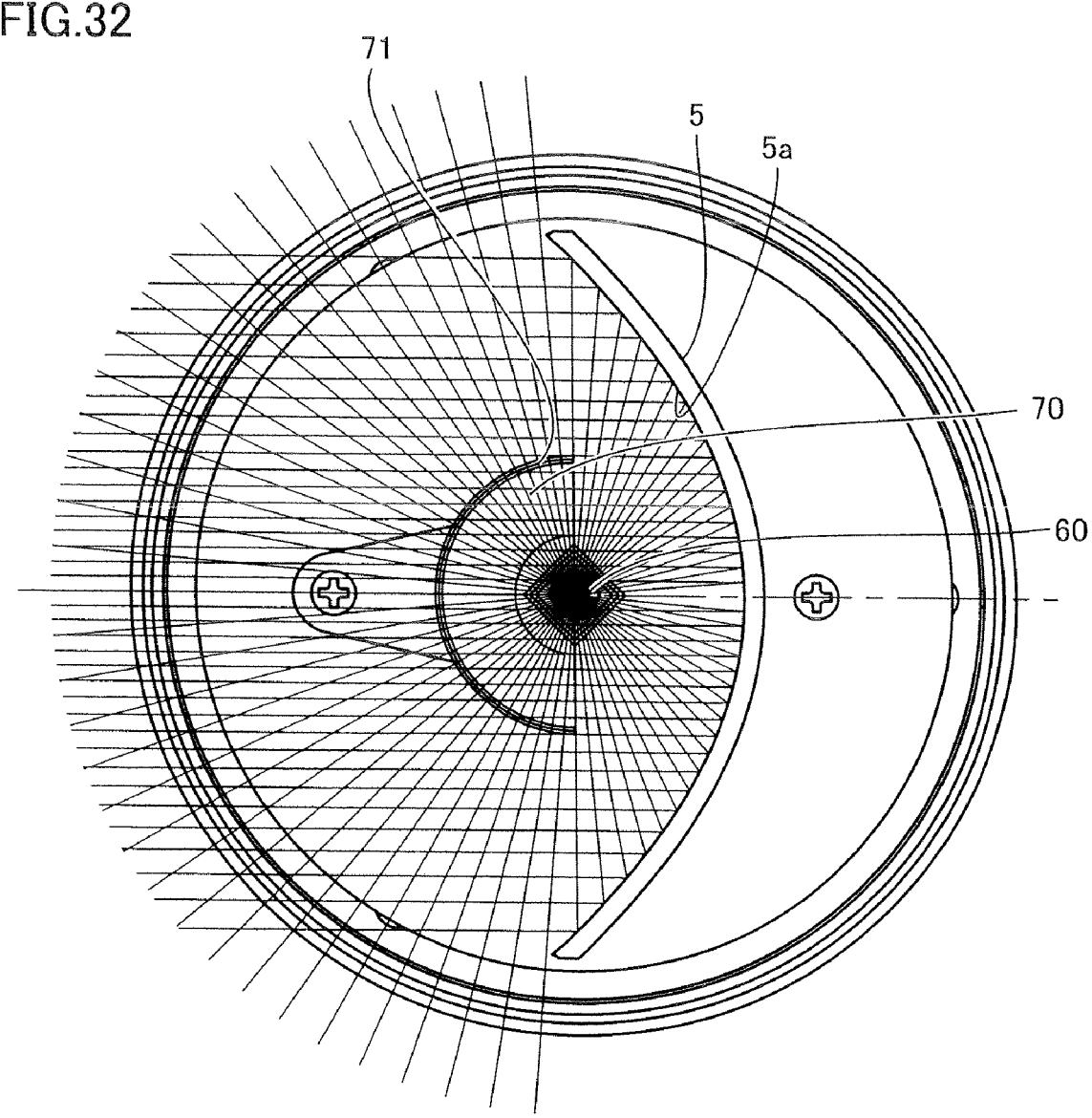
FIG. 32 is a partially fragmented plan view of the reflecting mirror of the rotating lamp.

FIG. 32 is a partially fragmented plan view of the reflecting mirror 5 of the rotating lamp showing the path of the light emitted from the power LED 60. As shown in FIG. 32, the light emitted from the power LED 60 is radially scattered about the power LED 60 through the light guide 70 as viewed from above, and the angle of emission is set to about 180°. Further, the light is scattered by the scattering portion 71 also upward and downward as shown in FIG. 31, so that the rotating lamp 600 radiates the light also upward and downward in the range of about 180° as viewed from above and the observer can observe the light scattered by the scattering portion 71 from various positions.

While the scattering portion 71 and the neck portion 72 cover the power LED 60 over a semicircular region of about 180° about the power LED 60 in plan view in the rotating lamp 600 according to the sixth embodiment, the present invention is not restricted to this but the scattering portion 71 and the neck portion 72 may alternatively cover the power LED 60 over a region of at least or not more than about 180°. While the reflecting surface 5a is arranged to cover a peripheral portion of the power LED 60 opposite to the light guide 60 at an angle of about 180° as viewed from above, the present invention is not restricted to this but the reflecting surface 5a may alternatively cover the periphery of the power LED 60 at another angle.

In other words, the angle at which the scattering portion 71 and the neck portion 72 cover the periphery of the power LED 60 may be increased while reducing the angle at which the reflecting mirror 5 covers the periphery of the power LED 60, in order to ensure visibility of the light guide 70. The angles at which the light guide 70 and the reflecting mirror 5 cover the periphery of the power LED 60 is properly varied with the balance between visibility through the light guide 70 and that through the reflecting mirror 5.

It should be understood that the embodiments disclosed herein are illustrative rather than limitative in all aspects. The scope of the present invention is shown not in the foregoing description but in the claims, and all the equivalencies within the scope of the claims and all the modifications within the scope are intended to be embraced herein.

INDUSTRIAL APPLICABILITY

The present invention is suitable for a rotating lamp employing a light-emitting diode.

The invention claimed is:

1. A rotating lamp comprising:
a substrate;
a translucent globe mounted on said substrate;
a shaft portion set in said substrate;
a rotatable member rotatably supported by said shaft portion;
a reflecting mirror arranged on the upper surface of said rotatable member and at least partially constituted of a parabolic reflecting surface;
a light-emitting diode functioning as a light source;
a drive portion rotating/driving said rotatable member; and
an auxiliary reflecting minor arranged on the upper surface of said rotatable member and opposed to said reflecting minor,
wherein said light-emitting diode and said reflecting minor are arranged so that the optical axis of said light-emitting diode and said reflecting surface of said reflecting minor intersect with each other, and
wherein said light-emitting diode is arranged between said auxiliary reflecting mirror and said reflecting mirror.

2. The rotating lamp according to claim 1, wherein
said light-emitting diode is arranged on a focal position upon irradiation of parallel light toward said reflecting surface, and
said reflecting minor has a shape extending sideward from behind said light-emitting diode to project frontward beyond said light-emitting diode via a portion above said light-emitting diode.

3. The rotating lamp according to claim 1, wherein
said auxiliary reflecting mirror has an arcuately curved surface opposed to said reflecting mirror, and
said curved surface is inclined to be increased in height and gradually increased in circumferential length as separated from said light-emitting diode.

4. The rotating lamp according to claim 1, further comprising a flat support plate supporting said rotatable member and said shaft portion, wherein
said support plate is made of a material containing metal.

5. The rotating lamp according to claim 1, wherein said shaft portion is mounted to be stationary with respect to said substrate.

6. The rotating lamp according to claim 1, wherein said light-emitting diode is supported by said shaft portion.

7. The rotating lamp according to claim 1, wherein said rotatable member is rotatably supported to rotate with respect to said shaft portion and said substrate, and wherein said reflecting minor is fixedly mounted to said rotatable member.

8. A rotating lamp comprising:
a substrate;
a translucent globe mounted on said substrate;
a shaft portion set in said substrate;
a rotatable member rotatably supported by said shaft portion;
a reflecting minor arranged on the upper surface of said rotatable member and at least partially constituted of a parabolic reflecting surface;
a light-emitting diode functioning as a light source; and
a drive portion rotating/driving said rotatable member,
wherein said light-emitting diode and said reflecting minor are arranged so that the optical axis of said light-emitting diode and said reflecting surface of said reflecting mirror intersect with each other,
wherein a light emitter having said light-emitting diode includes an annular member and at least one platelike member arranged along the circumferential direction of said annular member so that a first end is arranged in said annular member, and
wherein said platelike member includes an extensional portion extending outward from said annular member.

9. The rotating lamp according to claim 8, further comprising:
a printed board provided with said light emitter, and
a coupling member coupling said printed board and said shaft portion with each other, wherein
said shaft portion, said printed board and said coupling member are made of a material containing metal.

10. A rotating lamp comprising:
a substrate;
a translucent globe mounted on said substrate;
a shaft portion set in said substrate;
a rotatable member rotatably supported by said shaft portion;
a reflecting minor arranged on the upper surface of said rotatable member and at least partially constituted of a parabolic reflecting surface;
a light-emitting diode functioning as a light source; and
a drive portion rotating/driving said rotatable member,
wherein said light-emitting diode and said reflecting mirror are arranged so that the optical axis of said light-emitting diode and said reflecting surface of said reflecting mirror intersect with each other, and
wherein said light-emitting diode is fixed to the upper wall of said globe.

11. The rotating lamp according to claim 10, further comprising a heat radiating portion capable of dispersing heat generated in said light-emitting diode outward, wherein
said light-emitting diode is fixed to the upper wall of said globe through said heat radiating portion.

12. The rotating lamp according to claim 11, wherein
said heat radiating portion includes a printed board mounted with said light-emitting diode on the surface thereof and a radiator plate mounted with said printed board on the surface thereof, and
said radiator plate is fixed to the upper wall of said globe.

13. The rotating lamp according to claim 10, further comprising a lead wire for supplying power to said light-emitting diode, wherein
said lead wire is arranged along the inner surface of said globe.

14. A rotating lamp comprising:
a substrate;
a translucent globe mounted on said substrate;
a shaft portion set in said substrate;
a rotatable member rotatably supported by said shaft portion;
a reflecting minor arranged on the upper surface of said rotatable member and at least partially constituted of a parabolic reflecting surface;
a light-emitting diode functioning as a light source; and
a drive portion rotating/driving said rotatable member,
wherein said light-emitting diode and said reflecting mirror are arranged so that the optical axis of said light-emitting diode and said reflecting surface of said reflecting mirror intersect with each other, wherein said reflecting mirror includes said parabolic first reflecting surface and second and third reflecting surfaces arranged on both sides of said first reflecting surface, wherein said second reflecting surface reflects light from said light-emitting diode toward said substrate beyond reflected light reflected by said first reflecting surface, and wherein said third reflecting surface reflects said light toward the upper end of said reflecting mirror beyond said reflected light.

15. The rotating lamp according to claim 14, wherein a plurality of said second reflecting surfaces and a plurality of said third reflecting surfaces are formed from said substrate toward the upper end of said reflecting mirror, the area of said second reflecting surface located on said substrate is smaller than the area of said second reflecting surface located on the upper end of said reflecting minor, and the area of said third reflecting surface located on the upper end of said reflecting mirror is smaller than the area of said third reflecting surface located on said substrate.

16. A rotating lamp comprising:

a substrate;

a translucent globe mounted on said substrate;

a shaft portion set in said substrate;

a rotatable member rotatably supported by said shaft portion;

a reflecting minor arranged on the upper surface of said rotatable member and at least partially constituted of a parabolic reflecting surface;

a light-emitting diode functioning as a light source; and a drive portion rotating/driving said rotatable member, wherein said light-emitting diode and said reflecting mirror are arranged so that the optical axis of said light-emitting diode and said reflecting surface of said reflecting mirror intersect with each other, further comprising a light guide guiding light from said light-emitting diode.

17. The rotating lamp according to claim 16, wherein said light guide has a reflecting surface reflecting said light.

18. The rotating lamp according to claim 16, further comprising a condensing portion condensing said light from said light-emitting diode and supplying said light to said light guide.

19. The rotating lamp according to claim 16, wherein said light guide is uprightly provided on said light-emitting diode, and has a scattering portion scattering said light on the forward end thereof.

* * * * *